United States Patent [19]
Fite et al.

[11] Patent Number: 5,142,634
[45] Date of Patent: Aug. 25, 1992

[54] BRANCH PREDICTION

[75] Inventors: David B. Fite, Northboro; John E. Murray, Acton; Dwight P. Manley, Holliston; Michael M. McKeon, Grafton; Elaine H. Fite, Northboro; Ronald M. Salett, Framingham; Tryggve Fossum, Northboro, all of Mass.

[73] Assignee: Digital Equipment Corporation, Maynard, Mass.

[21] Appl. No.: 306,760

[22] Filed: Feb. 3, 1989

[51] Int. Cl.⁵ .......................... G06F 9/26; G06F 9/38; G06F 9/40
[52] U.S. Cl. ..................... 395/375; 364/261.7; 364/243.4; 364/938; 364/948
[58] Field of Search ... 364/200 MS File, 900 MS File, 364/DIG. 1, DIG. 2

[56] References Cited
U.S. PATENT DOCUMENTS

| 4,200,927 | 4/1980 | Hughes | 364/200 |
| 4,332,010 | 5/1982 | Messina et al. | 364/200 |
| 4,500,958 | 2/1985 | Kubo et al. | 364/200 |
| 4,722,050 | 1/1988 | Lee | 364/200 |
| 4,847,753 | 7/1989 | Matsuo | 364/200 |
| 4,860,197 | 8/1989 | Langendorf | 364/200 |
| 4,860,199 | 8/1989 | Langendorf | 364/200 |
| 4,894,772 | 1/1990 | Langendorf | 364/200 |

OTHER PUBLICATIONS

Fossum et al., "An Overview of the VAX 8600 System," Digital Equipment Technical Journal, No. 1, Aug. 1985, pp. 8-23.
Troiani et al., "The VAX 8600 I Box, A Pipelined Implementation of the VAX Architecture," Digital Technical Journal, No. 1, Aug. 1985, pp. 24-42.
George R. Desrochers, *Principles of Parallel and Multiprocessing*, Internet Publications, Inc., McGraw-Hill Book Company, 1987, pp. 154-163.

Primary Examiner—David Y. Eng
Attorney, Agent, or Firm—Arnold, White & Durkee

[57] ABSTRACT

A branch prediction is made by searching a cache memory for branch history information associated with a branch instruction. If associated information is not found in the cache, then the branch is predicted based on a predetermined branch bias for the branch instruction's opcode; otherwise, the branch is predicted based upon the associated information from the cache. The associated information in the cache preferably includes a length, displacement, and target address in addition to a prediction bit. If the cache includes associated information predicting that the branch will be taken, the target address from cache is used so long as the associated length and displacement match and the length and displacement for the branch instruction; otherwise, the target address must be computed.

47 Claims, 22 Drawing Sheets

| $Q_1$ | $Q_0$ (USE TARGET FROM OPU) | STATE OF MARKERS |
|---|---|---|
| 0 | 0 | CLEAR |
| 0 | 1 | STORE IN UNWIND |
| 1 | 0 | IGNORE |
| 1 | 1 | STORE IN DECODE |

FIG. 6

| USE CACHE TARGET | PREDICT TAKEN | $D_1$ | $D_0$ | NEXT STATE OF MARKERS |
|---|---|---|---|---|
| 0 | 0 | 0 | 1 | STORE IN UNWIND |
| 0 | 1 | 1 | 1 | STORE IN DECODE |
| 1 | 0 | 1 | 0 | STORE IN UNWIND |
| 1 | 1 | 1 | 0 | IGNORE |

FIG. 7

| BRANCH VALID | PREDICT TAKEN | $Q_1$ | $Q_0$ | $D_1$ | $D_0$ | NEXT STATE OF MARKERS |
|---|---|---|---|---|---|---|
| 0 | 0 | 0 | 0 | 1 | 1 | STORE IN DECODE |
| 0 | 1 | 0 | 0 | 1 | 0 | IGNORE |
| 0 | d | 0 | 1 | 1 | 1 | STORE IN DECODE |
| 0 | d | 1 | 0 | 1 | 0 | IGNORE |
| 0 | d | 1 | 1 | 1 | 0 | IGNORE |
| 1 | 0 | 0 | 0 | 1 | 0 | IGNORE |
| 1 | 1 | 0 | 0 | 1 | 1 | STORE IN CODE |
| 1 | d | 0 | 1 | 1 | 0 | IGNORE |
| 1 | d | 1 | 0 | 1 | 0 | IGNORE |
| 1 | d | 1 | 1 | 1 | 1 | STORE IN DECODE |

FIG. 8

(NOTE: "d" means "don't care")

BSHOP
U=UNCOMDITIONAL BRANCH
C= CONDITIONAL BRANCH

FIG. 13 TARGET_VALID

BRANCH VALID
G=GOOD PREDICTION
B=BAD PREDICTION

TARGET_VALID
AND
BSHOP

U=UNCONDITIONAL BRANCH
C=CONDITIONAL BRANCH

BSHOP
U=UNCONDITIONAL BRANCH
C=CONDITIONAL BRANCH
AND
BRANCH VALID
G=GOOD PREDICTION
B=BAD PREDICTION

BRANCH VALID
G=GOOD PREDICTION
B=BAD PREDICTION
AND
TARGET_VALID

IF COMPLEX = 1, USE INTERNAL COND CODES

IF COMPLEX = 0, USE NEW PSL COND CODES

| MACRO BRANCHES | |
|---|---|
| UMB | TAKE_BRANCH |
| 0 | NOT Z |
| 1 | Z |
| 2 | NOT (N OR Z) |
| 3 | (N OR Z) |
| 4 | NOT N |
| 5 | N |
| 6 | NOT (C OR Z) |
| 7 | (C OR Z) |
| 8 | NOT V |
| 9 | V |
| A | NOT C |
| B | C |
| C | (N XOR V) OR Z |
| D | (N XOR V) |
| E | NOT SHF ZB |
| F | SHF ZB |

FIG. 22

BRANCH PREDICTION

RELATED APPLICATIONS

The present application discloses certain aspects of a computing system that is further described in the following U.S. patent applications filed concurrently with the present application: Evans et al., AN INTERFACE BETWEEN A SYSTEM CONTROL UNIT AND A SERVICE PROCESSING UNIT OF A DIGITAL COMPUTER, Ser. No. 07/306,325 filed Feb. 3, 1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. No. 07/306,837 filed Feb. 3, 1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,326 filed Feb. 3, 1989, abandoned, continued in Ser. No. 07/646,522 filed Jan. 28, 1991; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, Ser. No. 07/306,767 filed Feb. 3, 1989; D. Fite et al., DECODING MULTIPLE SPECIFIERS IN A VARIABLE LENGTH INSTRUCTION ARCHITECTURE, Ser. No. 07/307,347 filed Feb. 3, 1989; D. Fite et al., VIRTUAL INSTRUCTION CACHE REFILL ALGORITHM, Ser. No. 07/306,831 filed Feb. 3, 1989; Murray et al., PIPELINE PROCESSING OF REGISTER AND REGISTER MODIFYING SPECIFIERS WITHIN THE SAME INSTRUCTION, Ser. No. 07/306,833 filed Feb. 3, 1989; Murray et al., MULTIPLE INSTRUCTION PREPROCESSING SYSTEM WITH DATA DEPENDENCY RESOLUTION FOR DIGITAL COMPUTERS, Ser. No. 07/306,773 filed Feb. 3, 1989; Murray et al., PREPROCESSING IMPLIED SPECIFIERS IN A PIPELINED PROCESSOR, Ser. No. 07/306,846 filed Feb. 3, 1989; Fossum et al., PIPELINED FLOATING POINT ADDER FOR DIGITAL COMPUTER, Ser. No. 07/306,343 filed Feb. 3, 1989, and issued as U.S. Pat. No. 4,994,996 on Feb. 19, 1991; Grundmann et al., SELF TIMED REGISTER FILE, Ser. No. 07/306,445 filed Feb. 3, 1989; Beaven et al., METHOD AND APPARATUS FOR DETECTING AND CORRECTING ERRORS IN A PIPELINED COMPUTER SYSTEM, Ser. No. 07/306,828 filed Feb. 3, 1989 and issued as U.S. Pat. No. 4,982,402 on Jan. 1, 1991; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; E. Fite et al., CONTROL OF MULTIPLE FUNCTION UNITS WITH PARALLEL OPERATION IN A MICROCODED EXECUTION UNIT, Ser. No. 07/306,832 filed Feb. 3, 1989, and issued on Nov. 19, 1991 as U.S. Pat. No. 5,067,069; Webb., Jr. et al., PROCESSING OF MEMORY ACCESS EXCEPTIONS WITH PRE-FETCHED INSTRUCTIONS WITHIN THE INSTRUCTION PIPELINE OF A VIRTUAL MEMORY SYSTEM-BASED DIGITAL COMPUTER, Ser. No. 07/306,866 filed Feb. 3, 1989, and issued as U.S. Pat. No. 4,985,825 on Jan. 15, 1991; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, Ser. No. 07/306,544 filed Feb. 3, 1989, now abandoned, and continued in Ser. No. 07/746,007 filed Aug. 9, 1991; Hetherington, WRITE BACK BUFFER WITH ERROR CORRECTING CAPABILITIES, Ser. No. 07/306,703 filed Feb. 3, 1989, and issued as U.S. Pat. No. 4,995,041 on Feb. 19, 1991; Chinnaswamy et al., MODULAR CROSSBAR INTERCONNECTION NETWORK FOR DATA TRANSACTIONS BETWEEN SYSTEM UNITS IN A MULTI-PROCESSOR SYSTEM, Ser. No. 07/306,336 filed Feb. 3, 1989, and issued as U.S. Pat. No. 4,968,977 on Nov. 6, 1990; Polzin et al., METHOD AND APPARATUS FOR INTERFACING A SYSTEM CONTROL UNIT FOR A MULTI-PROCESSOR SYSTEM WITH INPUT/OUTPUT UNITS, Ser. No. 07/306,862 filed Feb. 3, 1989, and issued as U.S. Pat. No. 4,965,793 on Oct. 23, 1990; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, Ser. No. 07/306,404 filed Feb. 3, 1989 and issued as U.S. Pat. No. 5,043,874 on Aug. 27, 1991; and Gagliardo et al., METHOD AND MEANS FOR ERROR CHECKING OF DRAM-CONTROL SIGNALS BETWEEN SYSTEM MODULES, Ser. No. 07/306,836 filed Feb. 3, 1989, abandoned, continued in Ser. No. 07/582,493 filed Sep. 14, 1990.

TECHNICAL FIELD

The present invention relates generally to digital computers, and specifically to a pipelined central processing unit.

DESCRIPTION OF RELATED ART

Pipelining is a proven method for enhancing the performance of the central processing unit (CPU) in a digital computer In a pipelined CPU, multiple functional units concurrently execute the elementary operations for a plurality of instructions.

A pipelined CPU operates most efficiently when the instructions are executed in the sequence in which they appear in memory. For several classes of instructions, however, execution may jump to a specified instruction that is different from the next instruction in the instruction sequence. One such class is branch instructions.

When a branch instruction is executed, execution will either continue to the next sequential instruction or it will jump to an instruction at a specified "target" address. The "branch" specified by the branch instruction is said to be "taken" if the program jumps, or "not taken" if the next sequential instruction is executed.

Different kinds of branch instructions have various attributes. A branch instruction is either unconditional, meaning that the branch is taken every time that the instruction is executed, or conditional, meaning that the branch is taken or not depending upon a certain condition associated with the instruction. A branch instruction is also either simple or complex. Just before a simple branch instruction is executed, it is known whether the branch is to be taken. But for a complex branch instruction, it is not known whether the branch is to be taken until the instruction is actually executed.

Branch instructions cause stalls in conventional pipelined CPU's. In a simple pipelined processor, for example, a simple conditional branch instruction is fetched in a first cycle, decoded in a second cycle, and the branch decision is made in a third cycle. The CPU stalls the instruction fetching and decoding stages until it determines whether the branch is to be taken, so that instructions are fetched and decoded only if they are to be executed.

The "stall" time when the branch decision is being made can be used to some extent by prefetching the "target instruction" at the target address. Such a method is used in the VAX 8600 computer as described in Troiani et al., "The VAX 8600 I Box, A Pipelined Implementation of the VAX Architecture," Digital Technical Journal, Digital Equipment Corp., (1985), pp. 36-37.

In a first cycle, for example, a simple conditional branch instruction is fetched. In a second cycle, the branch instruction is decoded, and the instruction following the branch instruction is fetched. In a third cycle, the branch decision is made, the instruction following the branch instruction is decoded, and the instruction at the target address of the branch is fetched. If there is a "branch-taken" decision, the instruction following the branch instruction is flushed from the instruction decoder stage and fetching continues following the target address. If there is a "branch-not-taken" decision, the target instruction is cancelled by inserting a "no-operation" code into the decode stage, in lieu of the branch target instruction, and fetching continues with the sequence of instructions following the branch instruction.

The simple technique of fetching both the instruction following the branch instruction and the target instruction can be extended by decoding both of these fetched instructions, in what is known as a "prepare to branch" method. The fetching and decoding logic could be duplicated to provide additional processing prior to the branch decision. This method, however, is limited by the expense and complexity associated with the duplication of decoding logic and temporary storage.

Branch instructions occur frequently in programs (about one in every three to five instructions), and therefore pipeline stalls due to branches must be reduced to improve throughput. For this purpose, advanced pipelined CPUs employ "branch prediction" to predict the outcome of each conditional branch instruction when the branch instruction is decoded and to continue to some extent the fetching and execution of instructions beginning at the "target" address if the branch is predicted taken, or beginning with the next instruction after the branch instruction if the branch is predicted not taken. The direction the branch should take should be resolved as quickly as possible to either confirm that the direction of fetching and loading of instructions is correct or to resume fetching of the correct instruction stream.

Several methods of branch prediction have been proposed. See G. Desrochers, Principles of Parallel and Multiprocessing, Internet Publications Inc., New York (1987), pp. 161-163. A first method of branch prediction involves the storing of a "branch bias" bit for each branch instruction. When the instruction decoder decodes a branch instruction, it uses the "branch bias" bit to predict whether the branch will be taken or not. The bias can be determined statistically by observing the past history of the branch. The prediction made by this method is incorrect every time that the branch instruction branches contrary to the bias, and consequently the prediction is not very useful for instructions where the branch has about the same likelihood of being taken or not.

A second method of branch prediction, known as "history saving", involves attaching extra bits to the instructions stored in cache memory. The bits are set or reset, based upon the branch history of the instruction. For example, two extra bits could be used: one to indicate whether the last branch was taken (branch bit) and one to indicate whether the previous prediction was correct (wrong bit). The "branch" bit is examined to determine whether to fetch the next sequential instruction (for the case of previous branch not taken) or the branch target (for the case of previous branch taken). When the actual condition of the branch is computed and the branch decision is made, the "wrong" bit is updated to reflect whether the prediction was correct. If the last prediction and the current prediction were both incorrect, then the "branch" bit is negated to indicate a change in the "bias" for the branch instruction.

Still another method of branch prediction uses a "branch target buffer" in a "prepare to branch" scheme. In addition to a prediction mechanism, an address is saved that points to the target instruction of the branch. When it is predicted that a branch will be taken, the target address contained in the branch target buffer is used to fetch the target instruction, thereby saving the time necessary to perform the effective address calculation. As long as a branch instruction remains in cache, then, the calculation of the target's effective address will have to be calculated only once, when the branch is first encountered.

SUMMARY OF THE INVENTION

To provide branch predictions at the earliest possible time during a plurality of steps in the instruction decoding process, and to resolve the direction that the branch should take as quickly as possible, a pipelined digital computer includes a branch prediction unit that is coordinated with the pipeline stages and which anticipates or bypasses delays which are required for decoding and executing other kinds of instructions.

In accordance with a first aspect of the invention, a branch prediction is made for a branch instruction by searching a cache memory for associated branch history information. If associated information is not found in the cache, then the branch is predicted based on a predetermined branch bias for the branch instruction's operation code; otherwise, the associated information is read from the cache. If the associated information indicates a previous branch not taken, then the branch is predicted not taken. If the associated information indicates a previous branch taken, then the branch is predicted taken.

In accordance with another aspect of the present invention, the branch history cache stores previously used displacement information and target addresses. If associated information is found in the cache and the branch is predicted taken, then the associated displacement information is compared to displacement information for the branch instruction to determine whether the associated target address is valid for the branch instruction. If the associated target address is determined to be valid, then preprocessing of instructions in the branch begins immediately beginning with the instruction at the associated target address; otherwise, the target address is computed. The cache need never be flushed, because the target address from the cache is used only if the comparison of the displacement information guarantees that the computed target address will be the same. To minimize the required size of the cache, only new "branch taken" entries or entries for incorrectly predicted branches are written into the cache.

In accordance with another aspect of the invention, the execution unit of the pipeline processor looks ahead for an instruction capable of resolving a branch decision and when possible resolves that branch decision at least one execution cycle in advance.

In order to carry out branch predictions regardless of the sequence of instruction decoding, target address computation, and branch decision, a sequential state machine is used having primary states, secondary states (called "markers"), and status signals which determine any state change.

In order to carry out branch predictions for multiple branch instructions, the information for the respective branches is stored in a stack of registers, and the sequential state machine is provided with additional primary states which identify at any given time the status of both branch predictions, and with an additional set of markers for each conditional branch prediction that is pending.

BRIEF DESCRIPTION OF THE DRAWINGS

Other objects and advantages of the invention will become apparent upon reading the following detailed description and upon reference to the drawings in which:

FIG. 6 is a state table showing the four states of a set of markers which store branch prediction, decision or validation information in the simplified branch prediction unit of FIG. 4;

FIG. 7 is a state table showing how the markers of FIG. 6 are set in response to a branch prediction;

FIG. 8 is a state table showing how the markers of FIG. 6 are set in response to a branch decision or validation;

FIG. 22 is a table of the possible branch conditions; and

Figure 1:
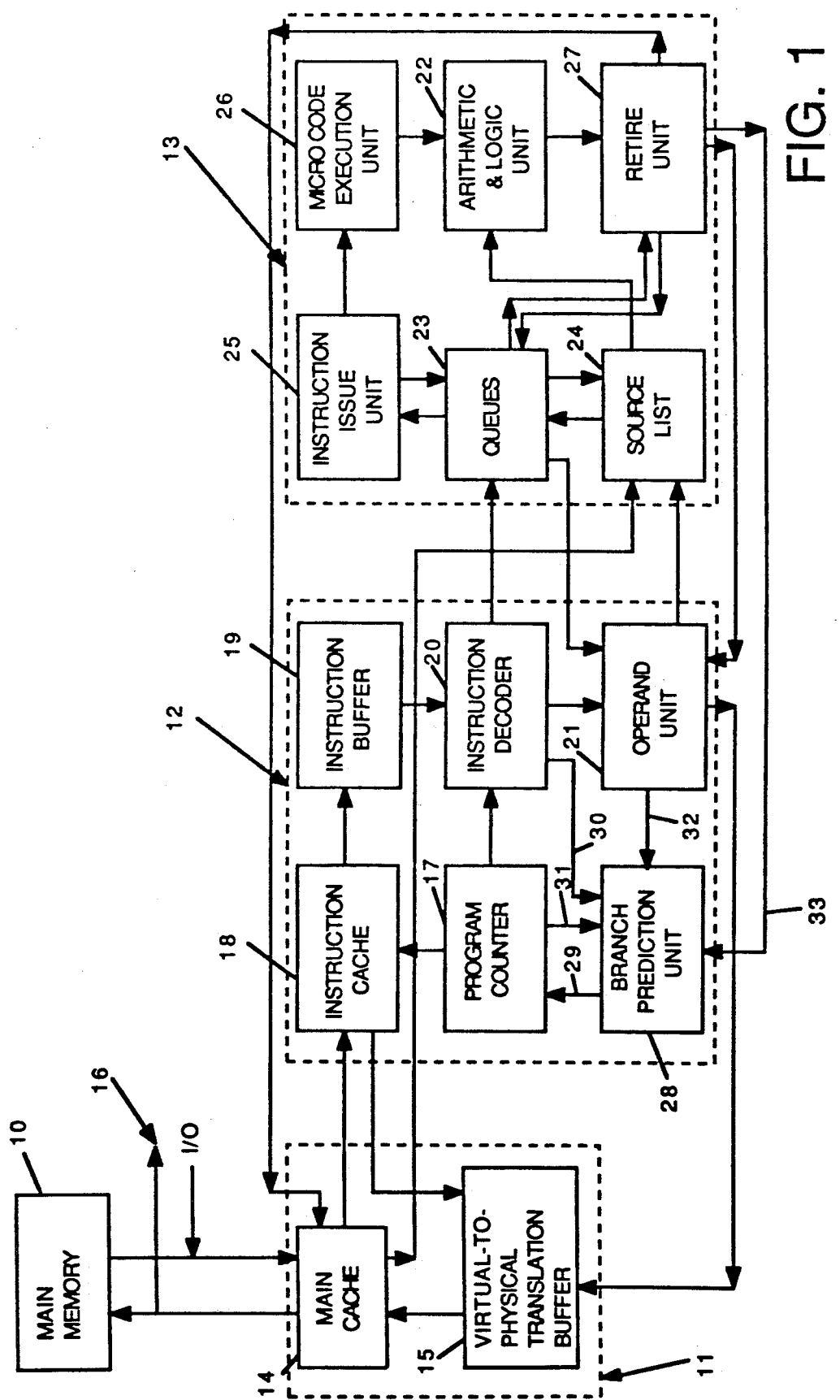
FIG. 1 is a block diagram of a digital computer system having a central pipelined processing unit which employs the present invention.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Turning now to the drawings and referring first to FIG. 1, there is shown a portion of a digital computer system which includes a main memory 10, a memory-CPU interface unit 11, and at least one CPU comprising an instruction unit 12 and an execution unit 13. It should be understood that additional CPUs could be used in such a system by sharing the main memory 10. It is practical, for example, for up to four CPUs to operate simultaneously and communicate efficiently through the shared main memory 10.

Both data and instructions for processing the data are stored in addressable storage locations within the main memory 10. An instruction includes an operation code (opcode) that specifies, in coded form, an operation to be performed by the CPU, and operand specifiers that provide information for locating operands. The execution of an individual instruction is broken down into multiple smaller tasks. These tasks are performed by dedicated, separate, independent functional units that are optimized for that purpose.

Although each instruction ultimately performs a different operation, many of the smaller tasks into which each instruction is broken are common to all instructions. Generally, the following steps are performed during the execution of an instruction: instruction fetch, instruction decode, operand fetch, execution, and result store. Thus, by the use of dedicated hardware stages, the steps can be overlapped in a pipelined operation, thereby increasing the total instruction throughput.

The data path through the pipeline includes a respective set of registers for transferring the results of each pipeline stage to the next pipeline stage. These transfer registers are clocked in response to a common system clock. For example, during a first clock cycle, the first instruction is fetched by hardware dedicated to instruction fetch. During the second clock cycle, the fetched instruction is transferred and decoded by instruction decode hardware, but, at the same time, the next instruction is fetched by the instruction fetch hardware. During the third clock cycle, each instruction is shifted to the next stage of the pipeline and a new instruction is fetched. Thus, after the pipeline is filled, an instruction will be completely executed at the end of each clock cycle.

This process is analogous to an assembly line in a manufacturing environment. Each worker is dedicated to performing a single task on every product that passes through his or her work stage. As each task is performed the product comes closer to completion. At the final stage, each time the worker performs his assigned task a completed product rolls off the assembly line.

In the particular system illustrated in FIG. 1, the interface unit 11 includes a main cache 14 which on an average basis enables the instruction and execution units 12 and 13 to process data at a faster rate than the access time of the main memory 10. This cache 14 includes means for storing selected predefined blocks of data elements, means for receiving requests from the instruction unit 12 via a translation buffer 15 to access a specified data element, means for checking whether the data element is in a block stored in the cache, and means operative when data for the block including the specified data element is not so stored for reading the specified block of data from the main memory 10 and storing that block of data in the cache 14. In other words, the cache provides a "window" into the main memory, and contains data likely to be needed by the instruction and execution units.

If a data element needed by the instruction and execution units 12 and 13 is not found in the cache 14, then the data element is obtained from the main memory 10, but in the process, an entire block, including additional data, is obtained from the main memory 10 and written into the cache 14. Due to the principle of locality in time and memory space, the next time the instruction and execution units desire a data element, there is a high degree of likelihood that this data element will be found in the block which includes the previously addressed data element. Consequently, there is a high degree of likelihood that the cache 14 will already include the data element required by the instruction and execution units 12 and 13. In general, since the cache 14 will be accessed at a much higher rate than the main memory 10, the main memory can have a proportionally slower access time than the cache without substantially degrading the average performance of the data processing system. Therefore, the main memory 10 can be comprised of slower and less expensive memory elements.

The translation buffer 15 is a high speed associative memory which stores the most recently used virtual-to-physical address translations. In a virtual memory system, a reference to a single virtual address can cause several memory references before the desired information is made available. However, where the translation buffer 15 is used, translation is reduced to simply finding a "hit" in the translation buffer 15.

An I/O bus 16 is connected to the main memory 10 and the main cache 14 for transmitting commands and input data to the system and receiving output data from the system.

The instruction unit 12 includes a program counter 17 and an instruction cache 18 for fetching instructions from the main cache 14. The program counter 17 preferably addresses virtual memory locations rather than the physical memory locations of the main memory 10 and the cache 14. Thus, the virtual address of the program counter 17 must be translated into the physical address of the main memory 10 before instructions can be retrieved. Accordingly, the contents of the program counter 17 are transferred to the interface unit 11 where the translation buffer 15 performs the address conversion. The instruction is retrieved from its physical memory location in the cache 14 using the converted address. The cache 14 delivers the instruction over data return lines to the instruction cache 18. The organization and operation of the cache 14 and the translation buffer 15 are further described in Chapter 11 of Levy and Eckhouse, Jr., Computer Programming and Architecture, The VAX-11, Digital Equipment Corporation, pp. 351-368 (1980).

Most of the time, the instruction cache has prestored in it instructions at the addresses specified by the program counter 17, and the addressed instructions are available immediately for transfer into an instruction buffer 19. From the buffer 19, the addressed instructions are fed to an instruction decoder 20 which decodes both the op-codes and the specifiers. An operand processing unit (OPU) 21 fetches the specified operands and supplies them to the execution unit 13.

The OPU 21 also produces virtual addresses. In particular, the OPU 21 produces virtual addresses for memory source (read) and destination (write) operands. For at least the memory read operands, the OPU 21 must deliver these virtual addresses to the interface unit 11 where they are translated to physical addresses. The physical memory locations of the cache 14 are then accessed to fetch the operands for the memory source operands.

In each instruction, the first byte contains the opcode, and the following bytes are the operand specifiers to be decoded. The first byte of each specifier indicates the addressing mode for that specifier. This byte is usually broken in halves, with one half specifying the addressing mode and the other half specifying a register to be used for addressing. The instructions preferably have a variable length, and various types of specifiers can be used with the same opcode, as disclosed in Strecker et al., U.S Pat. No. 4,241,397 issued Dec. 23, 1980.

The first step in processing the instructions is to decode the "opcode" portion of the instruction. The first portion of each instruction consists of its opcode which specifies the operation to be performed in the instruction. The decoding is done using a table-look-up technique in the instruction decoder 20. The instruction decoder finds a microcode starting address for executing the instruction in a look-up table and passes the starting address to the execution unit 13. Later the execution unit performs the specified operation by executing prestored microcode, beginning at the indicated starting address. Also, the decoder determines where source-operand and destination-operand specifiers occur in the instruction and passes these specifiers to the OPU 21 for pre-processing prior to execution of the instruction.

The look-up table is organized as an array of multiple blocks, each having multiple entries. Each entry can be addressed by its block and entry index. The opcode byte addresses the block, and a pointer from an execution point counter (indicating the position of the current specifier in the instruction) selects a particular entry in the block. The output of the lookup table specifies the data context (byte, word, etc.), data type (address, integer, etc.) and accessing mode (read, write, modify, etc.) for each specifier, and also provides a microcode dispatch address to the execution unit.

After an instruction has been decoded, the OPU 21 parses the operand specifiers and computes their effective addresses; this process involves reading GPRs and possibly modifying the GPR contents by autoincrementing or autodecrementing. The operands are then fetched from those effective addresses and passed on to the execution unit 13, which executes the instruction and writes the result into the destination identified by the destination pointer for that instruction.

Each time an instruction is passed to the execution unit, the instruction unit sends a microcode dispatch address and a set of pointers for (1) the locations in the execution-unit register file where the source operands can be found, and (2) the location where the results are to be stored. Within the execution unit, a set of queues 23 includes a fork queue for storing the microcode dispatch address, a source pointer queue for storing the source-operand locations, and a destination pointer queue for storing the destination location. Each of these queues is a FIFO buffer capable of holding the data for multiple instructions.

The execution unit 13 also includes a source list 24, which is a multi-ported register file containing a copy of the GPRs and a list of source operands. Thus entries in the source pointer queue will either point to GPR locations for register operands, or point to the source list for memory and literal operands. Both the interface unit 11 and the instruction unit 12 write entries in the source list 24, and the execution unit 13 reads operands out of the source list as needed to execute the instructions. For executing instructions, the execution unit 13 includes an instruction issue unit 25, a microcode execution unit 26, an arithmetic and logic unit (ALU) 22, and a retire unit 27.

Figure 2:
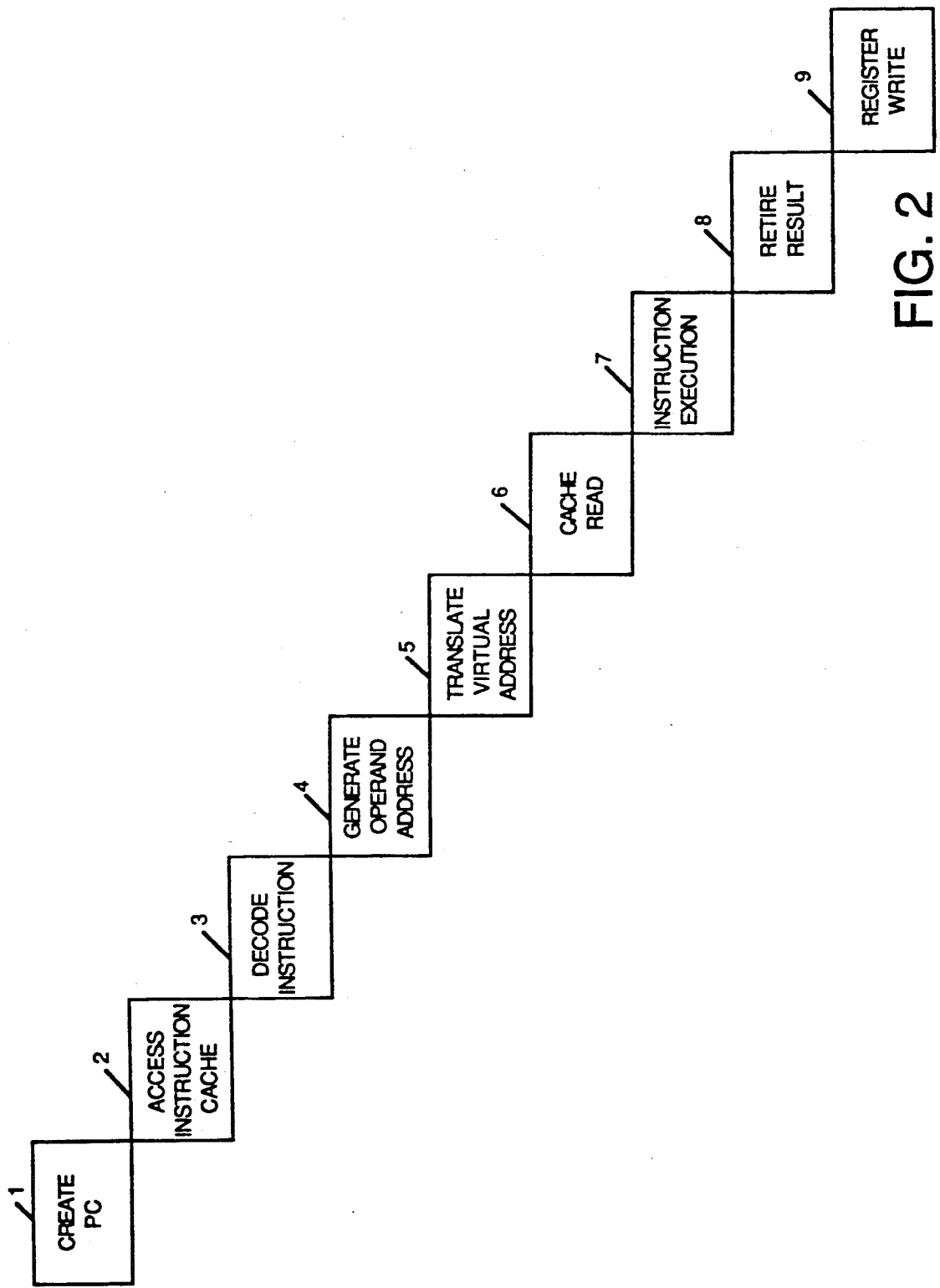
FIG. 2 is a diagram showing various steps performed to process an instruction and which may be performed in parallel for different instructions by a pipelined instruction processor according to FIG. 1.

The present invention is particularly useful with pipelined processors. As discussed above, in a pipelined processor the processor's instruction fetch hardware may be fetching one instruction while other hardware is decoding the operation code of a second instruction, fetching the operands of a third instruction, executing a fourth instruction, and storing the processed data of a fifth instruction. FIG. 2 illustrates a pipeline for a typical instruction such as:

ADDL3 R0,B^12(R1),R2.

This is a long-word addition using the displacement mode of addressing.

In the first stage of the pipelined execution of this instruction, the program count (PC) of the instruction is created; this is usually accomplished either by incrementing the program counter from the previous instruction, or by using the target address of a branch instruction. The PC is then used to access the instruction cache 18 in the second stage of the pipeline.

In the third stage of the pipeline, the instruction data is available from the cache 18 for use by the instruction decoder 20, or to be loaded into the instruction buffer 19. The instruction decoder 20 decodes the opcode and the three specifiers in a single cycle, as will be described in more detail below. The R1 number along with the byte displacement is sent to the OPU 21 at the end of the decode cycle.

In stage 4, the R0 and R2 pointers are passed to the queue unit 23. Also, the operand unit 21 reads the contents of its GPR register file at location R1, adds that value to the specified displacement (12), and sends the resulting address to the translation buffer 15 in the interface unit 11, along with an OP READ request, at the end of the address generation stage. A pointer to a reserve location in the source list for receiving the second operand is passed to the queue unit 23. When the OP READ request is acted upon, the second operand read from memory is transferred to the reserved location in the source list.

In stage 5, the interface unit 11 selects the address generated in stage 4 for execution. Using the translation buffer 15, the interface unit 11 translates the virtual address to a physical address during the address translation stage. The physical address is then used to address the cache 14, which is read in stage 6 of the pipeline.

In stage 7 of the pipeline, the instruction is issued to the ALU 22 which adds the two operands and sends the result to the retire unit 27. During stage 4, the register numbers for R1 and R2, and a pointer to the source list location for the memory data, was sent to the execution unit and stored in the pointer queues. Then during the cache read stage, the execution unit started to look for the two source operands in the source list. In this particular example it finds only the register data in R0, but at the end of this stage the memory data arrives and is substituted for the invalidated read-out of the register file. Thus both operands are available in the instruction execution stage.

In the retire stage 8 of the pipeline, the result data is paired with the next entry in the retire queue. Also at this time the condition codes, upon which the branch decisions are based, are available. Although several functional execution units can be busy at the same time, only one instruction can be retired in a single cycle.

In the last stage 9 of the illustrative pipeline, the data is written into the GPR portion of the register files in both the execution unit 13 and the instruction unit 12.

As introduced above, it is desirable to provide a pipelined processor with a mechanism for predicting the outcome of conditional branch decisions to minimize the impact of stalls or "gaps" in the pipeline. This is especially important for the pipelined processor of FIG. 1 since the queues 23 may store the intermediate results of a multiplicity of instructions. When stalls or gaps occur, the queues lose their effectiveness in increasing the throughput of the processor. The depth of the pipeline, however, causes the "unwinding" of an instruction sequence in the event of an incorrect prediction to be more costly in terms of hardware or execution time. Unwinding entails the flushing of the pipeline of information from instructions in the wrong path following a branch that was incorrectly predicted, and redirecting execution along the correct path.

As shown in FIG. 1, the instruction unit 12 of the pipeline processor is provided with a branch prediction unit 28. The specific function of the branch prediction unit 28 is to determine or select a value (PREDICTION PC) that the program counter 17 assumes after having addressed a branch instruction. This value or selection is transmitted over a bus 29 from the branch prediction unit 28 to the program counter unit 17.

The branch prediction unit 28 responds to four major input signals. When the instruction decoder 20 receives a branch opcode from the instruction buffer 19, branch opcode information and a branch opcode strobe signal (BSHOP) are transmitted over an input bus 30 to the branch prediction unit. At the same time, the address of the branch instruction (DECODE PC) is received on an input bus 31 from the program counter unit 17. The target address of the branch instruction (TARGET PC) and a target address strobe signal (TARGET VALID) are received on an input bus 32 from the operand unit 21. The operand unit 21, for example, adds the value of a displacement specifier in the branch instruction to the address of the instruction following the branch instruction to compute the target address. For conditional branches, the branch decision is made, and the prediction is validated, by a validation signal (BRANCH VALID) received with a data signal (BRANCH DECISION) on a bus 33 from the execution unit 13.

During the execution of most instruction sequences, the branch prediction unit 28 first receives a branch opcode and its corresponding address, next receives the corresponding target address, and finally receives a validation signal. As further described below, the branch prediction unit 28 responds to this typical sequence by making a branch prediction as soon as the branch opcode and its corresponding address are received. Preferably this is done by reading a "branch history" cache memory (79 in FIG. 4) addressed by the least significant bits of the address of the branch instruction; a tag match is performed on the remainder of the address in order to determine that the addressed information stored in the cache is associated with the branch instruction. To avoid waiting for the operand processing unit to compute the target address, the previously computed target address of the branch instruction is also stored in the branch history cache.

The tag match may fail because either the branch instruction has never been previously encountered or its branch history has been overwritten in the cache by the branch history of a different instruction. In either case, the branch prediction is made based upon the opcode of the instruction. Each branch instruction has a predetermined bias that is static during the execution of a particular computer program. When a "branch taken" prediction is made on the basis of a branch bias, the value (PREDICTION PC) that the program counter assumes is the target address (TARGET PC) computed by operand unit 21. When the target address becomes available, the branch prediction unit directs it to the program counter unit. The target address is also written into the branch history cache to make it available in the event that the same branch instruction is encountered again.

When a "branch not taken" decision is made, there is no need to wait for a target address, since the program counter may advance as a matter of course to the next instruction immediately following the branch instruction. Also, there is no need to record the "branch not taken" prediction in the cache, since this neither changes the outcome of a subsequent prediction for the same instruction, nor will it enable such a subsequent prediction to be made quickly.

Whenever the branch prediction unit makes a branch prediction for a conditional branch instruction, the beginning address (PC UNWIND) of the alternate path that it did not take is saved for restoring the program counter unit 17 in the event that the branch prediction is found to be erroneous.

The preferred method of validating the branch prediction for a conditional branch instruction is to tag the opcode information in the instruction decoder with a "prediction" bit which indicates whether the branch was predicted taken. As introduced above, the instruction decoder 20 decodes the opcode by a look-up table (the "fork" table) to obtain a corresponding entry point address in microcode executed by the microcode execution unit 26. The entry point address is tagged with the prediction bit, and the prediction bit therefore passes through the queues 23 and the instruction issue unit 28. When the microcode execution unit 26 executes the microcode for the instruction, it compares the prediction bit to the respective condition governing the branch decision to generate the validation signal (BRANCH VALID) and signals the branch prediction unit with the BRANCH DECISION signal over line 33.

To speed up the validation process for simple conditional branches, the microcode execution unit is programmed via its microcode to "look ahead" and see whether the next instruction is a simple conditional branch instruction, and if so, it will generate and transmit the validation signal (BRANCH VALID) at the end of execution of its current instruction. This same logic is used in a similar fashion for complex branch instructions, in which the decision to branch is governed by the execution of the branch instruction itself; its own execution effectively changes its respective condition. In this case, the "look ahead" logic looks for the next microinstruction to do a branch check, and the validation signal (BRANCH VALID) is transmitted as soon as the condition code is determined. An example of a complex branch instruction is "ACBx". This instruction, when executed, adds the number A to the number C and compares the sum to the number B to decide whether to branch.

There is a possibility that a "page fault" may occur in the middle of a complex branch instruction, due to the fact that the processor of FIG. 1 uses a virtual-to-physical translation buffer 15. Since the displacement specifier is the last specifier and it is not passed to the execution unit, the execution unit can completely execute the branch instruction even if the displacement faults. The conventional way of correcting the fault is for the processing unit to discard the results of the partially-completed complex branch instruction and restore the state of the processor to the state existing just prior to the time that the instruction causing the fault was loaded into the instruction buffer 19 for decoding, i.e., the instruction boundary, so that the execution of the current program can be interrupted to cure the page fault by loading a new page of information into the main memory 10. (The new information, for example, is read from a mass storage device (not shown) connected to the I/O bus 16). After the page fault is cured in this fashion, the branch instruction is decoded and executed all over again.

Since simple branches do not change the machine state, the validation signal is sent by the execution unit as quickly as possible. If the displacement specifier page faults, the branch instruction can be re-executed. Complex branches, however, change machine state (GPR or memory) and then check the branch conditions. If the displacement specifier page faulted after the execution and validation of the complex branch, it could not be re-executed because the machine state was already changed. Therefore, on complex branches, the execution and subsequent validation are delayed until the execution unit is informed that the displacement specifier did not page fault.

If a conditional branch instruction is validated, then execution continues normally. Otherwise, when the branch decision disagrees with the prediction, an "unwind" operation is performed. This involves recording the decision in the branch history cache and then redirecting the instruction stream. The instruction stream is redirected by restoring the state of the central processing unit to the state which existed at the time the prediction was made, and then restarting execution at the beginning of the alternate execution path from the branch instruction. Execution is restarted, for example, at the previously saved "unwind" address (UNWIND PC).

Figure 3:
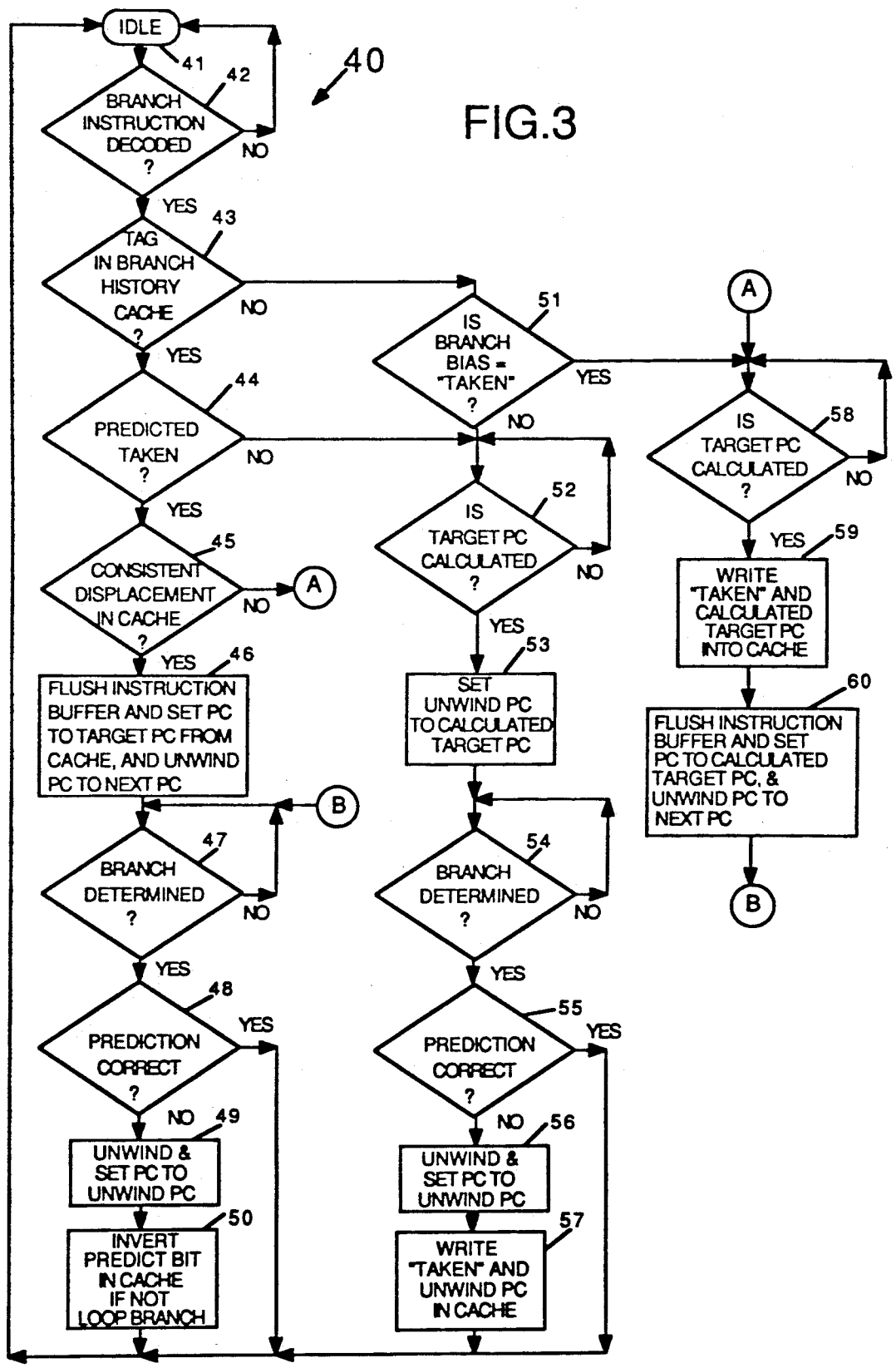
FIG. 3 is a flowchart of the preferred branch prediction method of the invention for the usual sequence of instruction decoding, target address computation, and branch determination or validation.

Turning now to FIG. 3 there is shown a flowchart generally designated 40 of the preferred branch prediction method of the invention for the usual sequence of instruction decoding, target address computation and branch decision or validation. The method is assumed to begin from an idle state during which no branch predictions are pending. In a first step 42, a branch prediction is initiated when a branch instruction is decoded. A least significant portion of the branch instruction's address is used to address a branch history cache memory, and in step 43, an associated tag read from the cache is compared to the most significant portion of the branch instruction's address. If a matching tag is found in the cache, then the entry for the cache most likely corresponds to the prior branching history of the branch instruction.

According to an important aspect of the present invention, however, the cache is not flushed or cleared when a new computer program is loaded; in other words, the cache is not flushed during context switches. This results in the elimination of a good deal of circuitry or processor time that would be needed to flush the cache. Since the cache is not flushed, there is a very small but potentially significant chance that the information in the cache associated with the branch instruction address will be invalid. However, for the purpose of predicting whether a branch will be taken or not, any information associated with the branch instruction address is sufficiently reliable to form the basis of a prediction. Therefore, in step 44, the branch is predicted taken or not taken depending upon the information in cache associated with the branch instruction address.

If the branch is predicted taken, then in step 45 displacement information for the branch instruction is compared with displacement information in the cache associated with the instruction address to determine whether the target address stored in the cache for the prior branch instruction having created the entry in cache is the same as the target address being computed for the current branch instruction having been decoded in step 42. If in step 45 the comparison indicates that the displacement information is consistent, then the associated target address from the cache is the target address of the branch instruction, and pre-processing of the branch begins immediately starting at the target address obtained from cache. In this case, in step 46 the instruction buffer is flushed and the program counter is set to the target program counter to begin fetching and preprocessing instructions starting at the target address. Also, the value of the instruction immediately following the branch instruction (NEXT PC) is saved (UNWIND PC) for use in unwinding the instruction stream if it is later found that the branch prediction was incorrect.

In step 47, the branch prediction unit waits until the branch is determined by the execution unit. When this occurs, the prediction is either validated or found to be incorrect in step 48. If the prediction is correct, then the branch prediction unit returns to its idle state 41. Otherwise, in step 49, it is necessary to unwind the instruction stream having been pre-processed by flushing any results of the pre-processing from the instruction decoder, operand unit and queues, and then setting the program counter to the previously saved value for unwinding (UNWIND PC). Also, since the prediction was taken from cache and is now found to be incorrect, it is necessary in step 50 to invert the prediction bit in the cache entry, at least if the instruction is not a "loop branch" instruction.

Loop branch instructions are instructions having certain operation codes that are very frequently used by compilers to implement loops in source language programs. An example of such a loop instruction is "ACBx" which adds A and C together and compares the result to B to determine whether to branch. Such an instruction is used by a FORTRAN compiler to implement a "DO LOOP" of the form "DO 100 I=1,10". In this case, the index K is iteratively added to 1 and the sum is compared to 10 in order for execution to pass through a loop of instructions ten times. In other words, the branch for the "loop branch" instruction is taken ten times, and is "not taken" only once at the end of processing for the loop. Consequently, loop instructions are always predicted taken.

In order for the prediction bit in the cache to accurately reflect this fact, it is not inverted in step 50 if the current instruction is a "loop branch" instruction. It should be noted, however, that it is not essential for the prediction in the cache to accurately reflect the prediction for a loop branch instruction, since the prediction read from the cache is set to 1 by an OR gate whenever the branch for a "loop branch" instruction is being predicted. The predictions in the cache for loop and unconditional branches are always "taken". If an unconditional or loop branch is being decoded and the prediction bit indicates "not taken", the BP_HIT signal is deasserted; in this case the information stored in their cache cannot be information for the branch being decoded. This check is done to make a correct prediction as soon as possible in the case of an unconditional branch. This mechanism also insures that loop branches are always predicted taken.

Returning now to step 43, if a matching tag is not read from the branch history cache, then a prediction must be made without resort to the prior history of the instruction. In this case the preferred method of making a branch prediction is to use a "branch bias" that is predetermined based on the operation code of the branch instruction. All unconditional branch instructions are predicted taken. Conditional branch instructions have a bias which can be set to a selected value when the computer is initialized, or possibly when a new computer program is loaded during a context switch. Therefore, the bias for a respective conditional branch opcode can be predetermined based on the statistical frequency of branching for that opcode and the particular kinds of programs that are to be run in the computer. If the computer is to execute a FORTRAN program complied by a particular compiler, for example, then the branch bias for respective opcodes can be determined by the frequency with which branches are taken and not taken for each opcode during the execution of a number of representative FORTRAN programs having been compiled by that compiler.

The prediction method continues from step 51 to step 52 if the branch bias indicates that a branch probably will not be taken. Also, execution branches from step 44 to step 52 if the prediction information in cache indicates that a branch will most likely not be taken. In step 52 the branch prediction unit waits until a value for the target address of the branch instruction is computed so that in step 53 the calculated target address can be used as the unwind address (UNWIND PC). Then, in step 54, the branch prediction unit waits until the execution unit can determine whether a branch is taken. Once the branch is determined, then in step 55 the prediction method branches depending on whether the prediction is correct. If so, then the branch prediction unit returns to its idle state in step 41. Otherwise, in step 56, preprocessing of the instruction stream is unwound and the program counter is set to the unwind value (UNWIND PC). Then, in step 57, an entry is written into the branch history cache to record the fact that the branch was taken and the unwind address (UNWIND PC) is written into the cache as the target address for the branch instruction, and the branch prediction unit returns to its idle state 41.

A cache entry was not previously written in step 53, since there is no need in the preferred procedure of FIG. 3 to ever create a new entry in the cache to predict that a branch instruction will not be taken. Therefore, by creating new entries only for branches that are to be predicted taken, the size of the cache memory need not be as large as it would otherwise need to be.

If a branch is predicted taken in step 51, or is predicted taken in step 44 but in step 45 the displacement information in the cache is found to be inconsistent with the displacement information for the instruction, then it is necessary in step 58 to calculate the target address for the branch instruction. Once the target address is calculated, then in step 59 a new entry can be written in cache or the inconsistent entry can be fixed by writing the target address into cache with branch prediction information predicting that the branch will be taken. It is preferable to update the cache immediately instead of waiting for the branch decision to verify the prediction since otherwise a register would be needed to save the calculated target address until the verification step. Since the branch is predicted taken, in step 60 the instruction buffer is flushed and the program counter is set to the value of the calculated target address and the unwind address is set to the value of the address of the instruction immediately following the branch instruction (NEXT PC). The branch prediction method then continues in step 47 to validate the prediction and to correct the prediction information in the cache if the prediction is found to be incorrect.

Figure 4:
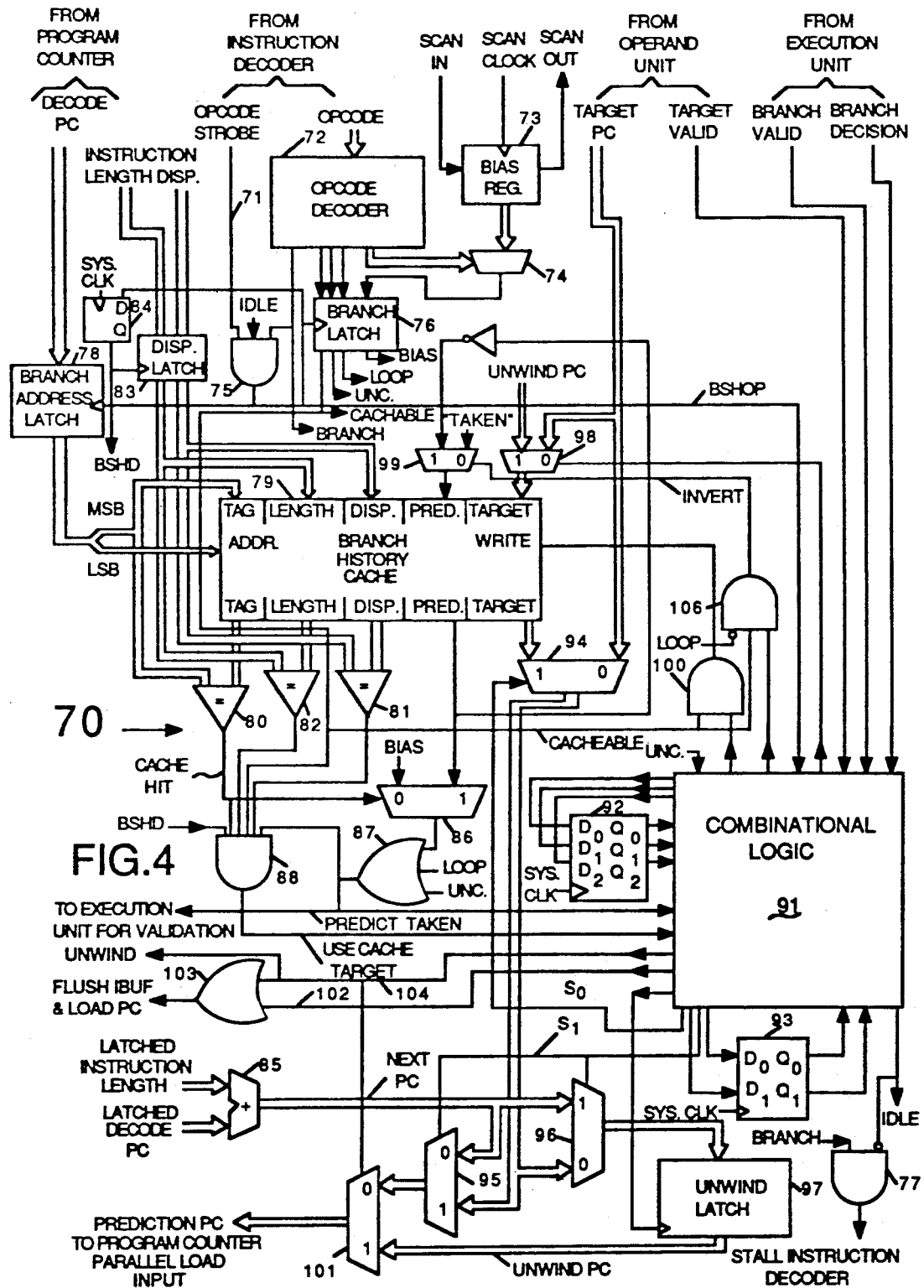
FIG. 4 is a schematic diagram of a simplified branch prediction unit which cannot predict multiple branches simultaneously.

Turning now to FIG. 4 there is shown a schematic diagram of a simplified branch prediction unit generally designated 70 that cannot predict multiple branches simultaneously. In other words, when instructions in the predicted path are being decoded, the decoder will stall upon recognizing a branch instruction. Once the operation of the simplified branch prediction unit of FIG. 4 is understood, the operation of the preferred branch prediction unit described in FIGS. 9 to 18 will be more easily understood.

The branch prediction unit 70 receives an opcode strobe on a line 71 from the instruction decoder when a new instruction is decoded. The instruction decoder includes an opcode decoder 72 which indicates whether the opcode is a branch instruction, and also whether the opcode specifies a unconditional branch instruction or a loop branch instruction. The instruction decoder also includes a shift register 73 for serially receiving bias bits for respective conditional branch instruction operation codes when the register 73 is clocked by a scanning clock signal. The "bias bit" for each conditional branch is set up in this register using the scan system when the processor is powered on. When the instruction decoder recognizes a unconditional branch instruction, the opcode decoder 72 operates a multiplexer 74 which selects the respective bias bit from the register 73.

When the instruction decoder has completely decoded a branch instruction, a gate 75 in the branch prediction unit 70 generates a branch opcode strobe (BSHOP). The gate 75 is active upon the coincidence of the opcode strobe signal on line 71, the decoding of a branch opcode by the opcode decoder 72, and a signal indicating that the branch prediction unit 70 is in an idle state. The branch opcode strobe (BSHOP) strobes a latch 76 receiving the information regarding the branch instruction being predicted. The latch 76 holds this information while the instruction decoder decodes subsequent instructions in the predicted path. However, if a subsequent branch instruction is recognized in the predicted path when the branch prediction unit 70 is not in its idle state, then the instruction decoder is stalled by a signal from a gate 77 in this simplified embodiment of FIG. 4.

The branch opcode strobe (BSHOP) also strobes a latch 78 for holding the address of the branch instruction having its branch predicted. The least significant portion of this address is used to address a branch history cache memory 79 that stores an instruction length, an instruction displacement, a branch prediction bit and a target address in association with an address. In particular, the cache is organized as an associative memory storing respective tags which are compared to the most significant portion of the instruction address using a comparator 80. In other words, the comparator 80 indicates whether the cache holds a length, displacement, prediction bits, and target address that is associated with the address of the branch instruction under consideration.

To determine whether the cache includes associated displacement information consistent with the displacement information for the branch instruction, there is provided a comparator 81 for comparing the displacement stored in the cache with the displacement for the instruction, and another comparator 82 for comparing the instruction length stored in the cache to the length of the branch instruction. For the branch prediction unit 70 unit in FIG. 4, the instruction length and displacement for the instruction are received one cycle after the branch opcode strobe. In other words, the displacement for the branch instruction is explicitly contained in the instruction. If this it true, the instruction can be a "cacheable" instruction.

In order to hold the instruction length and displacement during processing, the branch prediction unit 70 includes a latch 83 strobed by a branch displacement strobe (BSHD) that is provided by a delay flip-flop 84 which delays the branch opcode strobe by the time needed for the instruction decoder to obtain the length and displacement of the instruction.

In FIG. 4 the cache 79 is organized to associate information with the addresses of branch instructions. In this case, the target address for a given branch instruction is computed by adding both the length and displacement to the address of the branch instruction. Therefore, the displacement information stored in the cache and associated with a given branch instruction is consistent with the displacement information for the branch instruction when both the length stored in the cache matches the length of the instruction and the associated displacement stored in cache matches the displacement for the instruction.

For the circuit in FIG. 4, the address of the next instruction (NEXT PC) is computed by an adder 85 at the same time that the cache 79 is first addressed during the cycle when the branch opcode strobe occurs. The comparator 80 indicates whether a matching tag was found in the cache memory, corresponding to step 43 in FIG. 3. Therefore, the output of the comparator 80 is used to operate a multiplexer 86 which selects the prediction from the cache when there is a matching tag (corresponding to step 44 in FIG. 3) or selects the bias when there is not matching tag (corresponding to step 51 in FIG. 3). In any case, both loop branches and unconditional branches are always predicted taken, as insured by an OR gate 87.

If it is predicted that a branch will be taken and if a matching tag was found in the cache, then it is necessary to determine whether the displacement information in the cache is consistent with the displacement information for the current branch instruction. For this purpose the outputs of the comparators 81 and 82 are fed along with the latched displacement valid signal (DV), the output of the comparator 80, and the BSHD signal to a NAND gate 88 which determines whether the associated target from the cache should be used at the target address for the pending branch instruction. The predict taken signal and the adjusted cache hit signal are fed to a sequential state machine including combinational logic 91, a primary state register 92, and a marker register 93. The combinational logic 91 receives the branch opcode strobe (BSHOP) as well as a target valid signal indicating when the computed target address is received from the operand unit (21 in FIG. 1) and also a branch decision signal from the execution unit (13 in FIG. 1) indicating when a branch had been decided or validated. In response to the present state of the primary state register 92 as well as the state of the marker register 93, the combinational logic 91 determines a next state for the primary state register 92 depending upon the particular sequence of the branch opcode strobe, the target valid signal and the branch decision signal for the pending branch instruction. In particular, in response to the branch opcode strobe, the combinational logic sets the marker register 93 based upon the "predict taken" signal and the "use cache target" signal in order to determine what to do with the computed target address (TARGET PC) received from the operand unit when the target valid signal is asserted.

A multiplexer 94 selects either the target from the cache 79 or the target from the operand unit. Multiplexers 95 and 96 select the target selected by the multiplexer 94. In particular, if a branch is predicted taken, then the target selected by the multiplexer 94 is fed to the program counter by a multiplexer 95 and the address of the instruction immediately following the branch instruction (NEXT PC) is fed to an unwind latch 97 via the multiplexer 96. Alternatively, when it is predicted that a branch will not be taken, then the multiplexer 96 feeds the selected target to the unwind latch 97 and the multiplexer 95 feeds the NEXT PC to the program counter.

In the typical sequence, the set of markers in the register 93 are set in response to the "predict taken" and the "use cache target" signals after the branch opcode strobe (BSHOP) is asserted. When a valid target is received from the operand unit, this calculated target is used in the manner indicated by the state of the marker register 93. In particular, if a branch is to be taken but the target from the cache is not to be used, then a "taken" prediction is written into the cache along with the calculated target from the operand unit. For this purpose, the combinational logic 91 operates a multiplexer 98 to select the target from the operand unit to be written into the cache, and a multiplexer 99 asserts a logical value of "taken" to be written into the prediction bit of the branch history cache. An AND gate 100, however, insures that an entry is written into the cache 7 only if the pending branch instruction is "cacheable."

If a target is received and the markers indicate that a branch will not be taken but the computed target should be saved, then the combinational logic 91 strobes the unwind latch 97 to receive the target from the operand unit. Otherwise, if the branch is predicted taken, the unwind latch 97 receives the NEXT PC, and the target selected by the multiplexer 94 is fed through the multiplexer 95 and another multiplexer 101 through the program counter. When the "use cache target" signal is asserted or otherwise later when the computed target is received from the operand unit, the combinational logic 91 sends a signal over a line 102 to a gate 103 transmitting a signal to flush the instruction buffer (19 in FIG. 1 and load the program counter (17 in FIG. 1) with the PREDICTION PC value selected by the multiplexer 101. Therefore, if there is a cache hit, it is predicted that a branch is taken, and the associated displacement information in the cache is consistent with the displacement for the instruction, then the combinational logic 91 need not wait for a valid target from the operand unit before it issues the signal on line 102 to begin pre-processing of instruction in the branch.

In the usual instruction sequence, the execution unit validates a branch prediction after the pre-processing of some instructions in the predicted path. If the branch prediction is found to be valid, then the branch prediction unit 70 returns to its idle state. Otherwise, the combinational logic 91 asserts a signal on line 104 to unwind the instruction sequence. The signal on line 104 causes the multiplexer 101 to transmit the unwind address from the unwind latch 97 to be loaded into the program counter. In addition, the combinational logic 91 updates cache 79 to reflect the path taken by the branch decision. If it had been incorrectly predicted that a branch would not be taken, then a value of "taken" is written into the associated prediction bit in cache. In addition, the combinational logic operates the multiplexer 98 to write the unwind address from the unwind latch into the associated target in cache. This creates a new cache entry if the branch was originally predicted not taken on the basis of the bias for the branch instruction. Alternatively, if the prediction had been based on the prediction from the cache, then the old entry in cache is updated with the new target address because it is possible that the target address may have changed for the branch instruction.

If the incorrect prediction had been that the branch would be taken, then the value "not taken" is written into the associated prediction bit in cache along with their displacement, length and tag. The target is not relevant in this case. In addition, a gate 106 insures that the prediction bit will not be changed for a loop branch instruction or if the branch instruction is not cacheable.

In the preferred embodiment, the cache 79 has 1024 entries, each entry including a 22 bit tag portion, a 6 bit length portion, a 16 bit displacement portion, a one bit prediction portion, and a 32 bit target portion.

Figure 5:
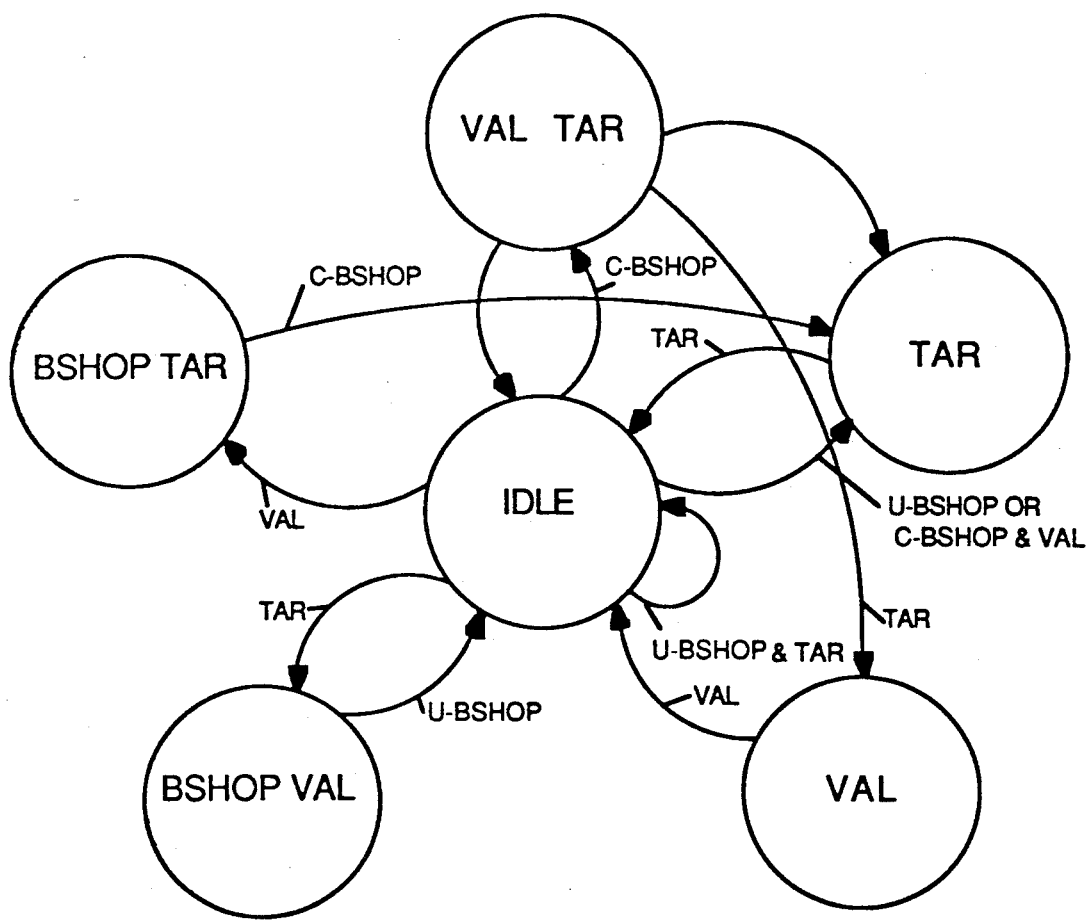
FIG. 5 is a state diagram for the primary states of the simplified branch prediction unit of FIG. 4.

The operation of the simplified branch prediction unit 70 of FIG. 4 has been described in connection with the usual sequence of instruction decoding, target address computation, and branch validation. In accordance with an important aspect of the present invention, the branch instruction decoding, target address computation, and branch validation can occur in any sequence for a respective branch instruction. The combinational logic 91 is programed to respond in a optimal fashion to any possible sequence. As shown in FIG. 5, this is done by defining primary states of the branch prediction unit corresponding to the possible sequences, and indicated by the state of the register 92. If it is assumed that only a single branch instruction is being pre-processed at any given time, then there are a total of six possible states including the idle state. Aside from the idle state, the other five states are conveniently named by the strobe signals that the combinational logic 91 must receive in order to return to the idle state. In the state diagram of FIG. 5, the target valid signal has been abbreviated to TAR and the branch decision or validation signal has been abbreviated to VAL.

In the usual sequence described above in connection with FIG. 3, a conditional branch instruction is first decoded (C-BSHOP) and the branch prediction unit moves from its idle state to its VAL TAR state. Then, the branch prediction unit receives a target (TAR) and moves to its VAL state. Finally, the branch prediction unit receives a validation signal (VAL) from the execution unit and returns to its idle state.

The usual sequence is slightly different for an unconditional branch instruction, because unconditional branches need not be, and preferably are not validated by the execution unit. Therefore, when the branch prediction unit is initially in its idle state and an unconditional branch instruction (U-BSHOP) is decoded, the branch prediction unit changes to a TAR state and waits for a computed target. Upon receiving the computed target, the branch prediction unit returns to its idle state. This same sequence occurs if the branch prediction unit decodes a conditional branch instruction and at the same time receives a valid target (C-BSHOP & VAL).

The branch prediction unit will stay in the TAR state waiting for a computed target even if it obtains a valid target from the cache and begins the preprocessing of instructions for the branch. In other words, the states shown in FIG. 5 are primary states and the branch prediction unit may do different things at different times in the primary states depending upon the inputs to the combinational logic 91 other than the primary states supplied by the register 92.

The branch prediction unit includes a state BSHOP VAL that is reached only for certain unconditional branches that have implied displacement specifiers after the displacement specifiers, such as the instruction JSB (jump to subroutine). In these cases it is possible for a valid target to be received before the instruction is entirely decoded. Therefore, the branch prediction unit stays in the BSHOP VAL state until the unconditional branch instruction is decoded (U-BSHOP). It is also possible for the branch prediction unit to decode an unconditional branch instruction and receive a valid target at the same time (U-BSHOP & TAR).

It is also possible for the branch prediction unit to receive a branch validation signal before a conditional branch instruction displacement has been fetched from memory. When this occurs the branch prediction unit moves to a BSHOP TAR state and waits for decoding of the conditional branch instruction to be completed (C-BSHOP).

As noted above, the operations to be performed by the branch prediction unit are dependent upon the state of the markers as well as the primary states shown in FIG. 5. There are a number of different ways that the markers could be used to record branch prediction and branch decision or validation information. For the circuits shown in FIG. 4, the markers preferably record the information as shown in FIG. 6. When the branch prediction unit is in its TAR state, the markers indicate what should be done when a computed target address is received from the operand unit. The marker bit Q0 indicates whether the computed target from the operand processing unit should be used, corresponding to the selection by the multiplexer 94 in FIG. 4. The two marker bits Q1, Q0 in combination define four states referred to as a "clear" state, a "store in unwind" state, an "ignore" state, and a "store in decode" state.

The "clear" state indicates that no branch prediction or decision has been made. The "store in unwind" state indicates that a branch has been predicted "not taken" and the computed target should be saved in the unwind latch 97 for unwinding the instruction stream being pre-processed in the event that the execution unit decides that the prediction was incorrect. The "ignore" state indicates that the computed target should be ignored because either the target from the cache has been used or the execution unit has decided that the branch is not taken. The "store in decode" state indicates that when the computed target address is received from the operand unit, the instruction buffer is to be flushed and the program counter is to be loaded with the computed target address to begin pre-processing instructions in response to a prediction that the branch will be taken or a decision to take the branch.

Whenever the next state of the branch prediction unit is the idle state, the markers should be cleared. The markers are changed when: (1) a branch prediction is made coincident with the "BSHOP" signal; (2) when a target address is obtained as indicated by the "TAR" signal; or (3) when a validation signal "VAL" is asserted before the signal "BSHOP".

When the combinational logic 91 receives the BSHOP signal or the "use cache target" signal before the TAR or VAL signal, then the markers are set in response to the "use cache target" signal and the "predicted taken signal" as shown in FIG. 7. The computed target address from the operand unit is stored in the unwind latch when it is received if the branch is predicted not taken. If the branch is predicted taken, then unless the target from the branch history cache is to be used, the computed target is stored as the next decode PC; in other words, pre-processing begins at the target address. If a branch is predicted taken and the target from the cache is to be used, then the computed target is ignored.

In response to the TAR signal, the markers are cleared when the target actually arrives from the operand processing unit (21 in FIG. 1).

The markers must be set or modified when a branch decision or validation is made (VAL) before the target address is received (TAR). This could be done in a number of ways, and the preferred way is shown in FIG. 8. In every case nothing needs to be stored in the unwind latch because the branch has been decided or validated. Consequently, in every case the next state D1 of the first marker Q1 is a logical 1.

If the branch decision (VAL) occurs before the prediction (BSHOP), then let use first assume that the markers will initially be clear. In this case the markers are set according to whether the branch is predicted taken or not. It "PREDICT TAKEN" is false and "BRANCH VALID" is false or if both are true, then the markers are set to the "STORE AND DECODE" state.

For the other cases in FIG. 8 the branch decision validates or invalidates a prior prediction. Therefore, the first marker Q1 indicates whether the branch was predicted taken or not, and the exclusive-NOR of the branch valid signal and the Q1 signal indicates whether quently, in both situations D0 is the exclusive-NOR of the branch valid signal and Q1.

Once conventions have been established for defining the states of the markers, it is possible to design the combinational logic 91 considering each possible transition shown in FIG. 5. For example, in order to design combinational logic 91 which enables the branch prediction unit 70 of FIG. 4 to carry out the typical sequence of FIG. 3, it is only necessary to consider the branch prediction unit transitioning from the idle state to the VAL TAR state, then to the VAL state, and then returning to the idle state. The elementary steps can be defined in terms of a high level language that could be compiled to standard sum of products form for reduction to hard-wired logic or into programing for a memory which would implement the combinational logic 91. For example, a program corresponding to the flowchart in FIG. 3 could be coded as follows:

```
IDLE:
    Q0 = D0
    Q1 = D1
    (IF (NOT UNC) AND BSHOP
         THEN  D1 = PREDICT_TAKEN
               D0 = 1
               S0 = 0
               GOTO VAL_TAR
         ELSE  D0 = 0
               D1 = 0
               GOTO IDLE)
VAL TAR:
    Q0 = D0
    Q1 = D1
    (IF USE_CACHE_TARGET AND S0 = 0
         THEN  D0 = 0
               D1 = 1
               S0 = 1
               FLUSH_IBUF_&_LOAD_PC
               STROBE_UNWIND_LATCH
               (IF TAR THEN GOTO VAL)
         ELSE  D0 = Q0
               D1 = Q1
               (IF TAR
                    THEN
                         (IF Q1 THEN
                              SELECT_TARGET_PC_WRITE
                              WRITE_CACHE_TAKEN
                              FLUSH_IBUF_&_LOAD_PC
                              STROBE_UNWIND_LATCH)
                         GOTO VAL
                    ELSE GOTO VAL_TAR))
VAL:
    Q0 = D0
    Q1 = D1
    (IF VAL
         THEN
               D0 = 0
               D1 = 0
               (IF (NOT BRANCH_VALID)
                    THEN      UNWIND
                    (IF Q1    THEN INVERT_PRED_IN_CACHE
                              ELSE
                                   SELECT_UNWIND_PC_WRITE
                                   WRITE_CACHE_TAKEN))
               GOTO IDLE
         ELSE
               D0 = Q0
               D1 = Q1
               GOTO VAL)
``` the branch is definitely to be taken or not. If the branch is to be taken, the computer target from the operand unit should be used when it becomes available (unless the target from the cache can be used earlier); therefore in this situation both D1 and D0 should be set to change the markers to the "store in decoder" state. Conse- Sequences for the other states are readily determined in a similar fashion.

The design of the processing unit to enable restoration of its state during the unwind process involves a number of trade offs. Since instruction processing continues on the selected execution path after branch prediction and some subsequent conditional branch instructions would be encountered prior to validation of the branch prediction, there is a question of whether the branching of any of these subsequent conditional branch instructions should be predicted, followed, and unwound when necessary. Also, some instructions are normally permitted to change the state of the general purpose registers before they are executed. For the VAX instruction architecture described in Levy and Eckhouse, supra, such instructions include "register increment" and "register decrement" specifiers which cause specified general purpose register to be incremented or decremented when the specifiers are evaluated by the operand unit 21.

The state of the central processing unit could be saved in duplicate registers at the time of branch prediction and restored immediately during the unwind process by transfer of data form the duplicate registers. If a multiplicity of duplicate registers are arranged as push-down stacks for storing and restoring the state of the central processing unit, any number of subsequent branches could be predicted, followed, and unwound in recursive fashion before an initial branch is validated. For the central processing unit in FIG. 1, however, the preferred tradeoff between hardware complexity and execution throughput dictates that the general purpose registers should not be permitted to be changed by instructions following a predicted branch until the branch is validated. In other words, if the operand unit 21 receives an auto-decrement or auto-increment specifier after a predicted branch, it will stall until the predicted branch is verified. Therefore, the general purpose registers need not be restored during the unwind operation, and the state of the processor is readily restored by flushing the pipeline of information from instructions in the incorrect path. The queues 23, for example, are flushed by incrementing a removal pointer by a selected number corresponding to the number of data elements to be flushed from the queues. The other pipeline stages are flushed by resetting flags which indicate whether data elements are valid.

For the central processing unit of FIG. 1, the branch prediction unit 28 preferably permits a single level of recursive branch prediction; in other words, the instruction unit 12 is permitted to decode instructions in pre-dicted paths following an initial and one subsequent conditional branch instruction before the initial branch prediction is validated. In order to provide a branch prediction unit which can pre-process instructions in multiple branches simultaneously, it is necessary to provide multiple registers or a stack for storing the information associated with each branch instruction pending in the branch prediction unit, and also to provide multiple registers or stacks for markers and UNWIND PC values associated with each conditional branch that is pending simultaneously.

Figure 9:
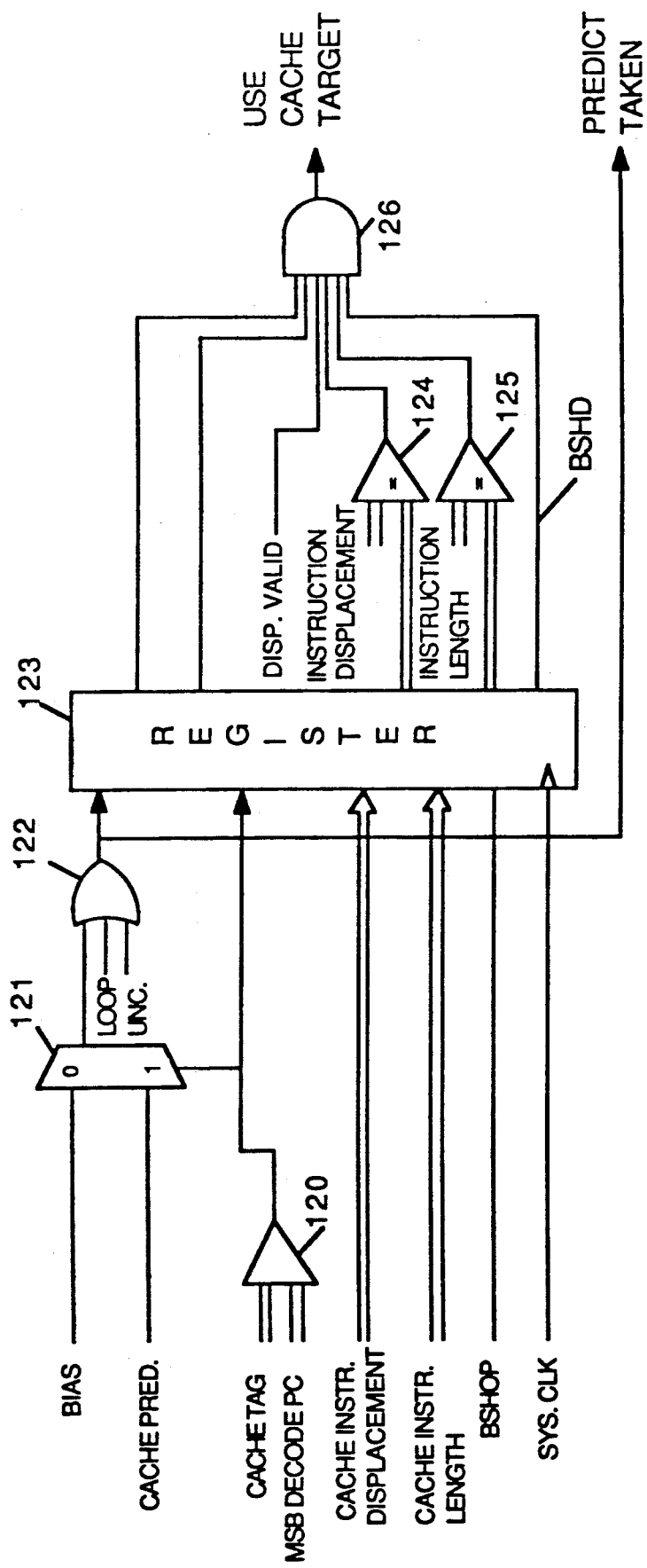
FIG. 9 is a schematic diagram of branch prediction and target address verification logic which is pipelined to permit a first set of markers assigned to a first branch instruction to be selectively changed in response to verification of a target address from the branch history cache at the same time that a second set of markers assigned to a second branch instruction is set in response to a branch prediction.

For predicting multiple branch instructions simultaneously, it is desirable to pipeline the branch prediction logic as shown in FIG. 9 so that a "use cache target" signal for a first branch instruction can be determined while the branch history cache is being read for a second branch instruction immediately following the first branch instruction. Also, it is desirable to set markers with the branch prediction information when the cache is read, and to change the markers at a subsequent cycle when it is determined whether the displacement information read from cache is consistent with the displacement information for the instruction.

As shown in FIG. 9, the most significant portion of the DECODE PC is compared to the cache tag in a comparator 120 and the cache hit signal operates a multiplexer 121 to select either the prediction bit from cache or the bias bit for the respective branch instruction. However, if the branch instruction specifies a loop or an unconditional branch, then an OR gate 122 predicts that these branches will be taken.

In order to determine the "use cache target" signal in a subsequent machine cycle, a pipeline register 123 receives the "predict taken" and "cache hit" signals along with the displacement and instruction length read from the branch history cache. In the subsequent cycle and in the next stage of the pipeline, a comparator 124 compares the displacement from the cache associated with the first branch instruction to the displacement of the first branch instruction, and another comparator 125 compares the instruction length from cache associated with the first instruction to the length of the first instruction. An AND gate determines whether the both the instruction displacements and instruction lengths match. The gate 126 is further enabled by the "displacement valid" and the BSHD signals to provide the "use cache target" signal. In response to the "use cache target" signal, the respective markers are typically changed to the "store in decode" state.

Figure 10:
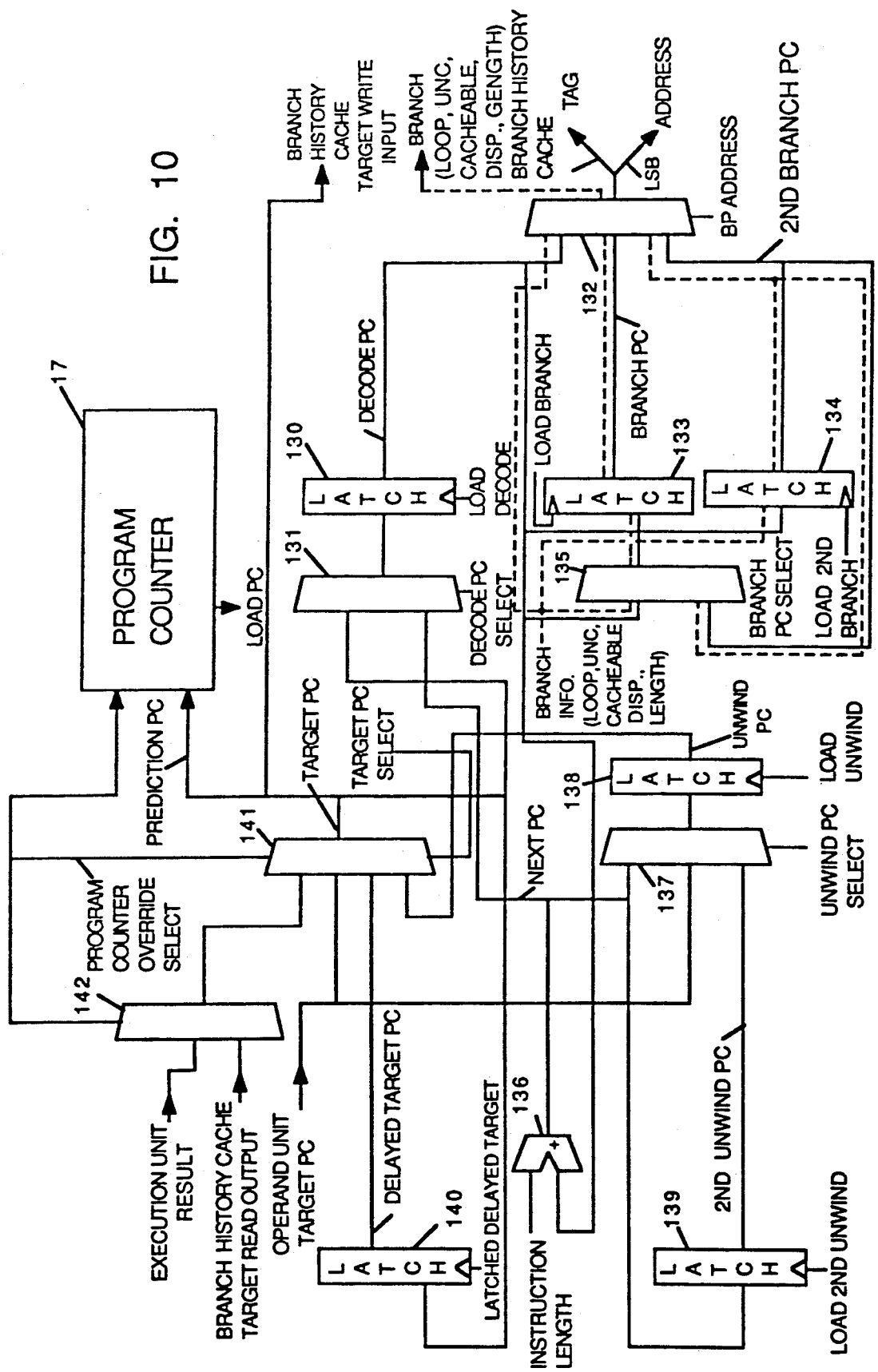
FIG. 10 is a schematic diagram of data path logic which includes stacks for branch instruction information and an "unwind" address.

Turning now to FIG. 10 there is shown a schematic diagram of data paths including multiple registers for storing the information associated with up to three branch instructions and storing a second unwind PC value for a second conditional branch instruction. These registers are implemented by latches which are controlled by control circuitry shown in FIG. 11. The data paths in FIG. 10 also include a number of multiplexers for selecting the inputs and outputs of the latches.

A latch 130 receives the value of the DECODE PC. This value is selected by a multiplexer 131 as either TARGET PC when decoding of a branch begins, or NEXT PC when decoding begins with the next sequential instruction. If the instruction being decoded is a branch instruction, a multiplexer 132 selects the DECODE PC in order to address the branch history cache for reading. It is possible, however, that other branch instructions have been decoded by the time it is necessary to write to the cache for the first instruction. Therefore, the DECODE PC for the branch, as well as all of the other information associated with the branch instruction, is stored in a two level stack including a first latch 133, a second latch 134, and a multiplexer 135 which selects either the DECODE PC or the output of the second latch 134 to be fed into the first latch 133.

The value of the NEXT PC is provided by an adder 136 which adds the length of the current instruction to the DECODE PC. A multiplexer 137 selects either the NEXT PC or the target address from the operand unit to be loaded into an unwind latch 138. Due to the fact that instructions may be pre-processed for two predicted branches, a second unwind latch 139 is also provided, although it need only be loaded with the NEXT PC value. The multiplexer 137 has an additional input for transferring the second UNWIND PC to the unwind latch 138.

It is possible for the operand unit to deliver its target value before the branch is shifted out of the instruction buffer. In this case, a latch 140 holds the TARGET PC until it is ready to be received into the latch 130 for use as the DECODE PC. The TARGET PC is selected by a multiplexer 141 as either the UNWIND PC, the target address from the operand unit, the delayed target address from the latch 140, or the target read out of the branch history cache. The program counter 17 also provides override signals to the multiplexer 141 and another multiplexer 142 to enable the program counter to begin execution at an address specified by the execution unit, although this is not pertinent to the operation of the branch prediction unit except for starting execution at a particular address.

Figure 11:
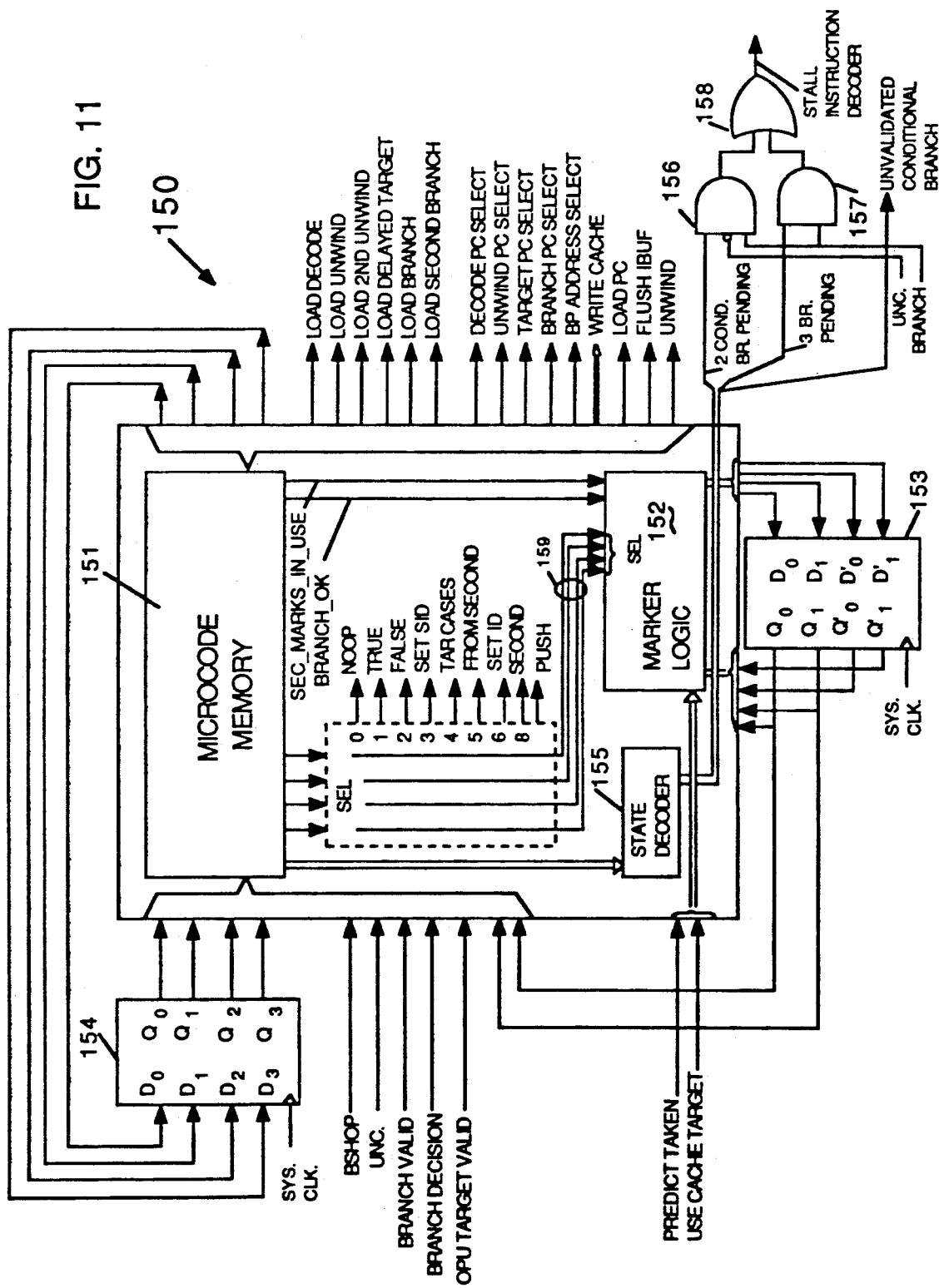
FIG. 11 is a block diagram of the preferred control logic used in connection with the branch prediction and target address verification logic of FIG. 9 and the data path logic of FIG. 11 to construct a branch prediction unit capable of predicting and pre-processing three branch instructions simultaneously, two of which can be conditional branch instructions.
Figure 12:
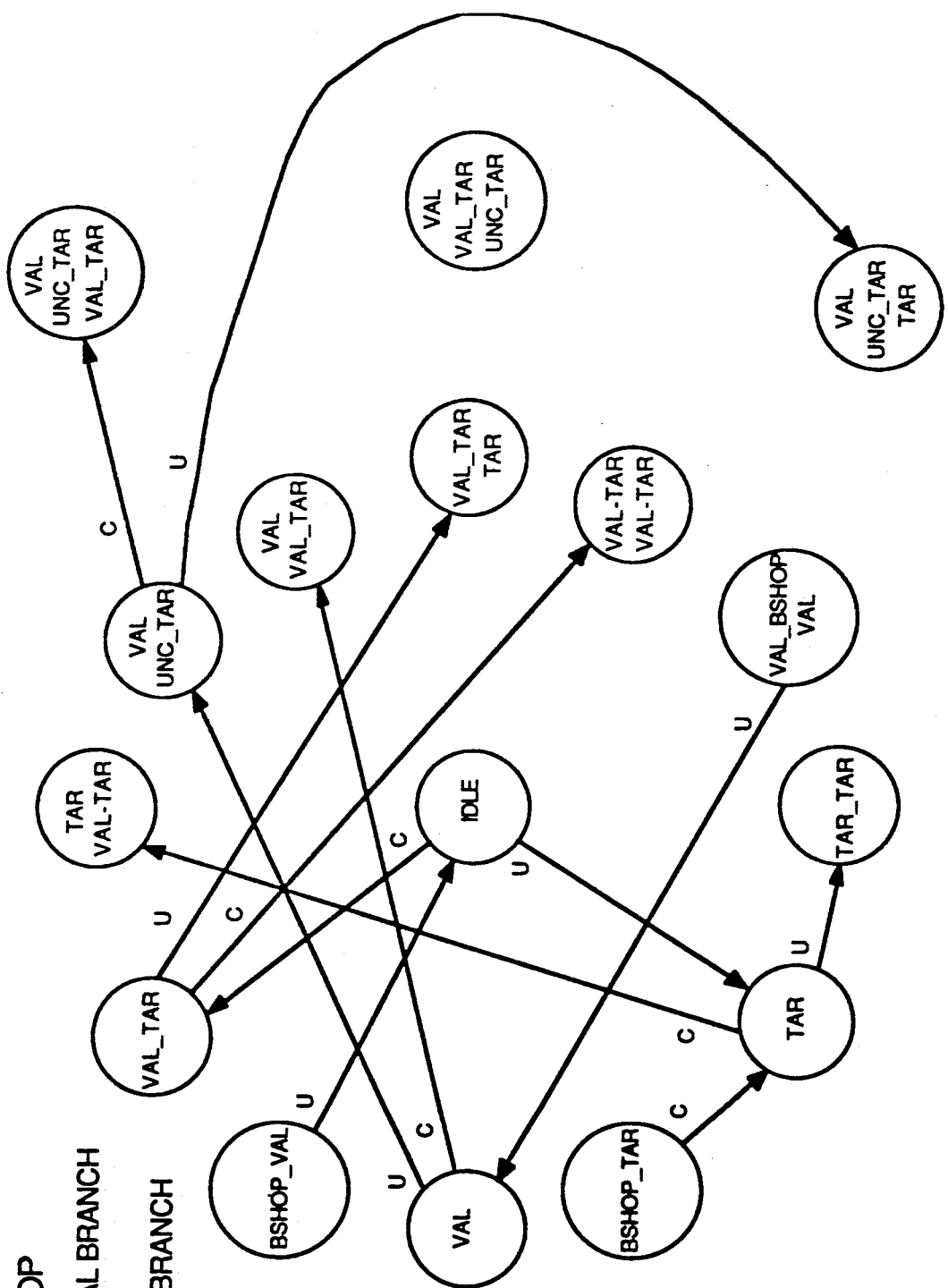
FIGS. 12 to 18 comprise state transition diagrams for the control logic, of FIG. 11.
Figure 13:
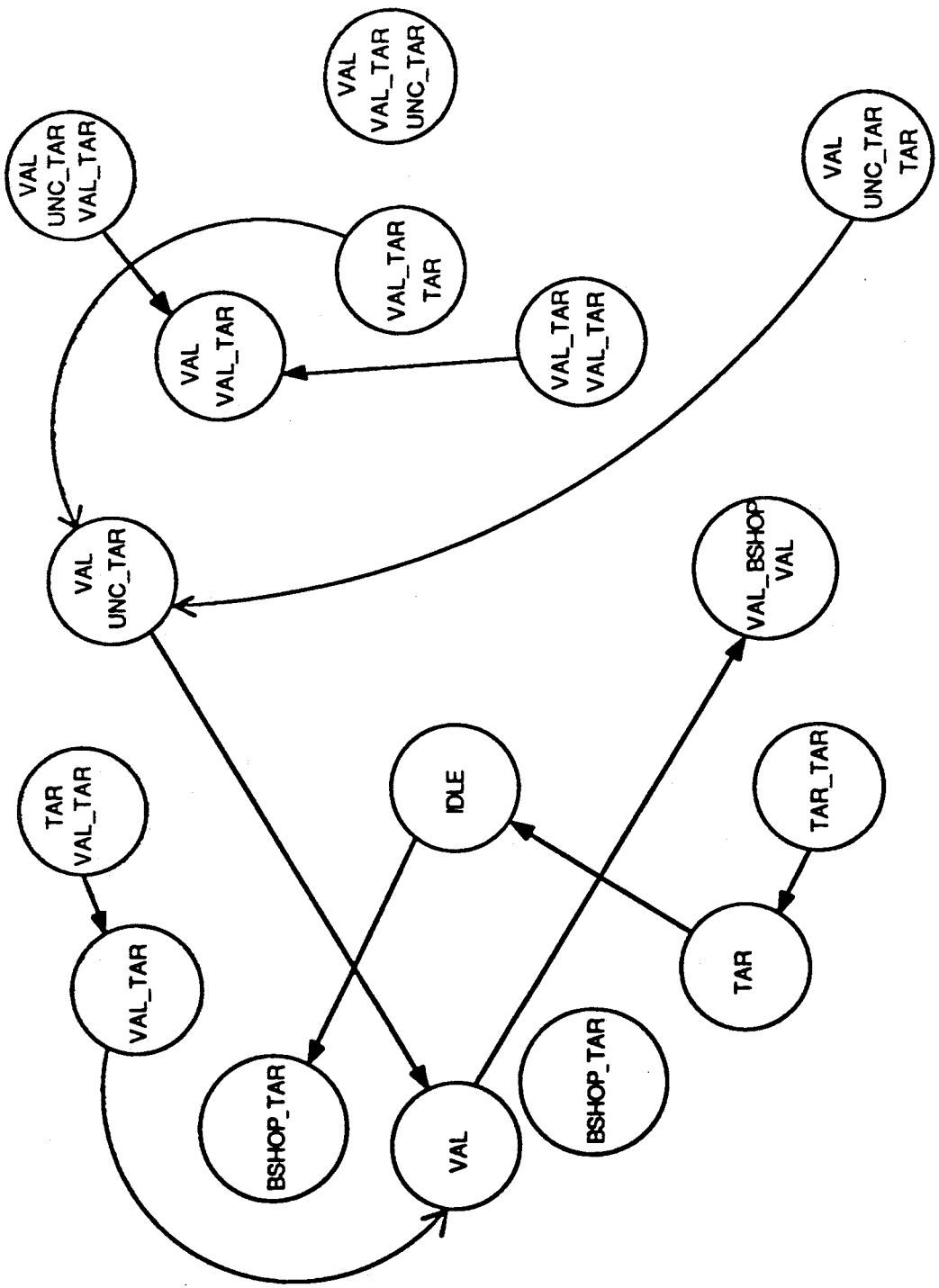
Figure 14:
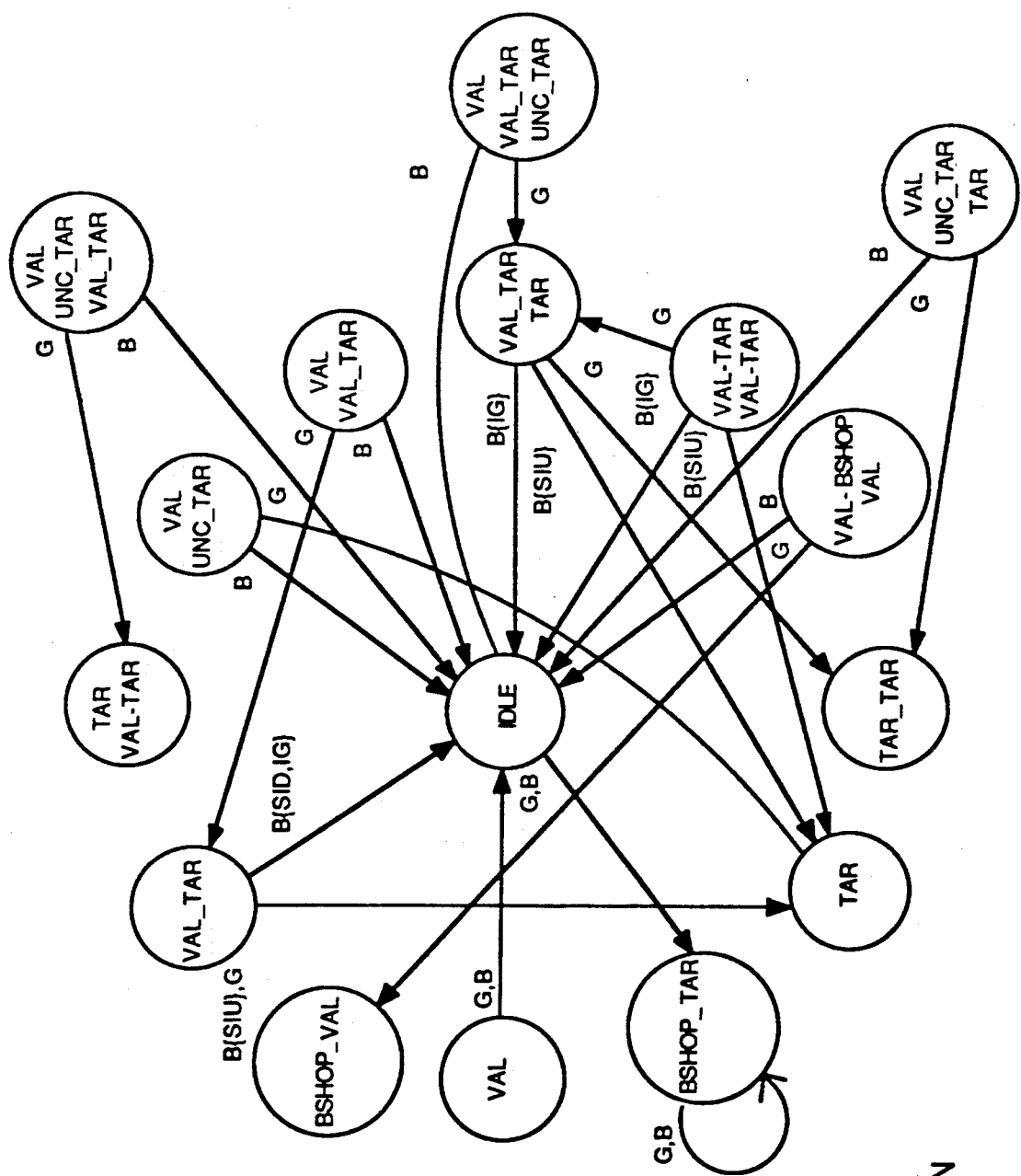
Figure 15:
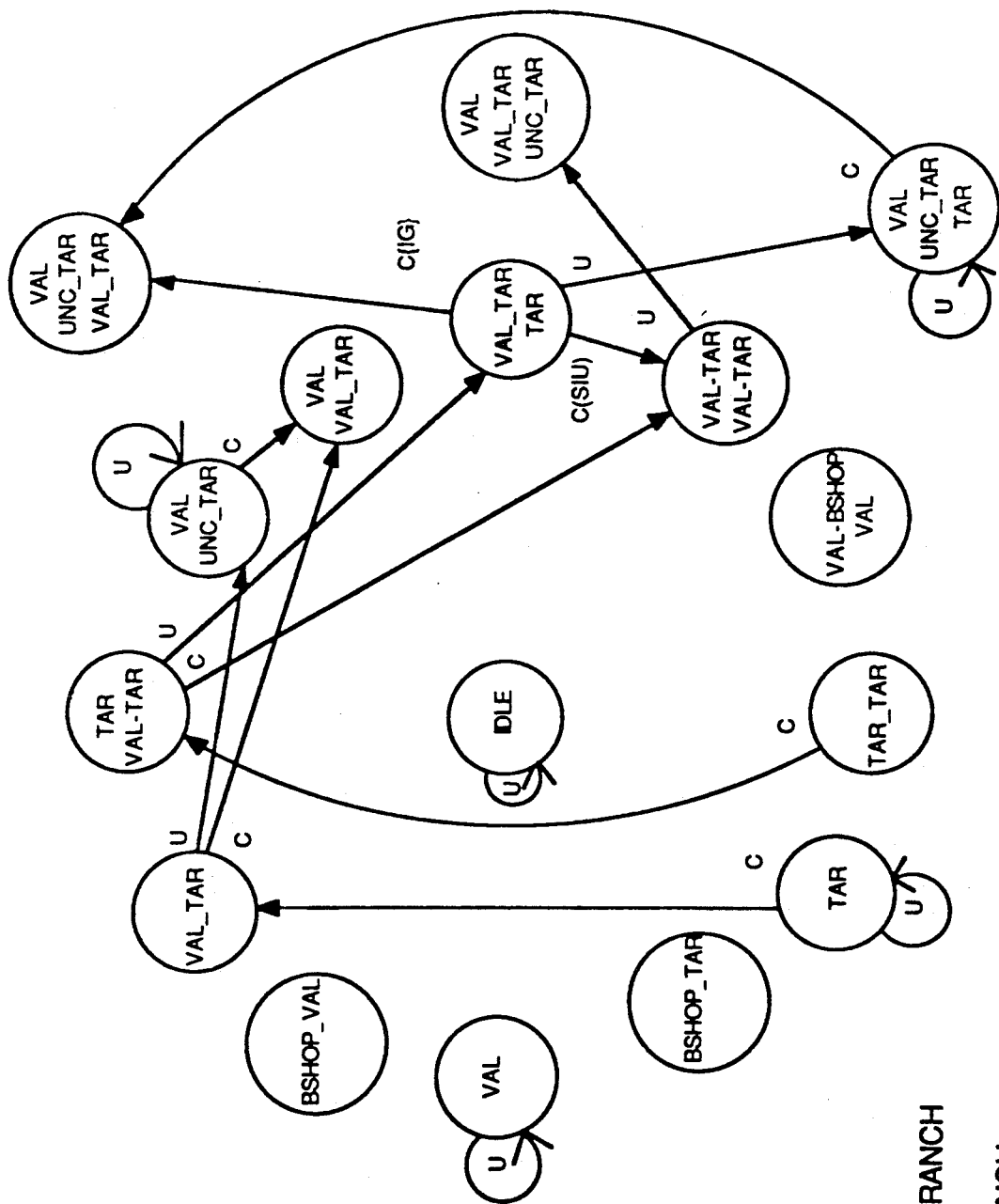
Figure 16:
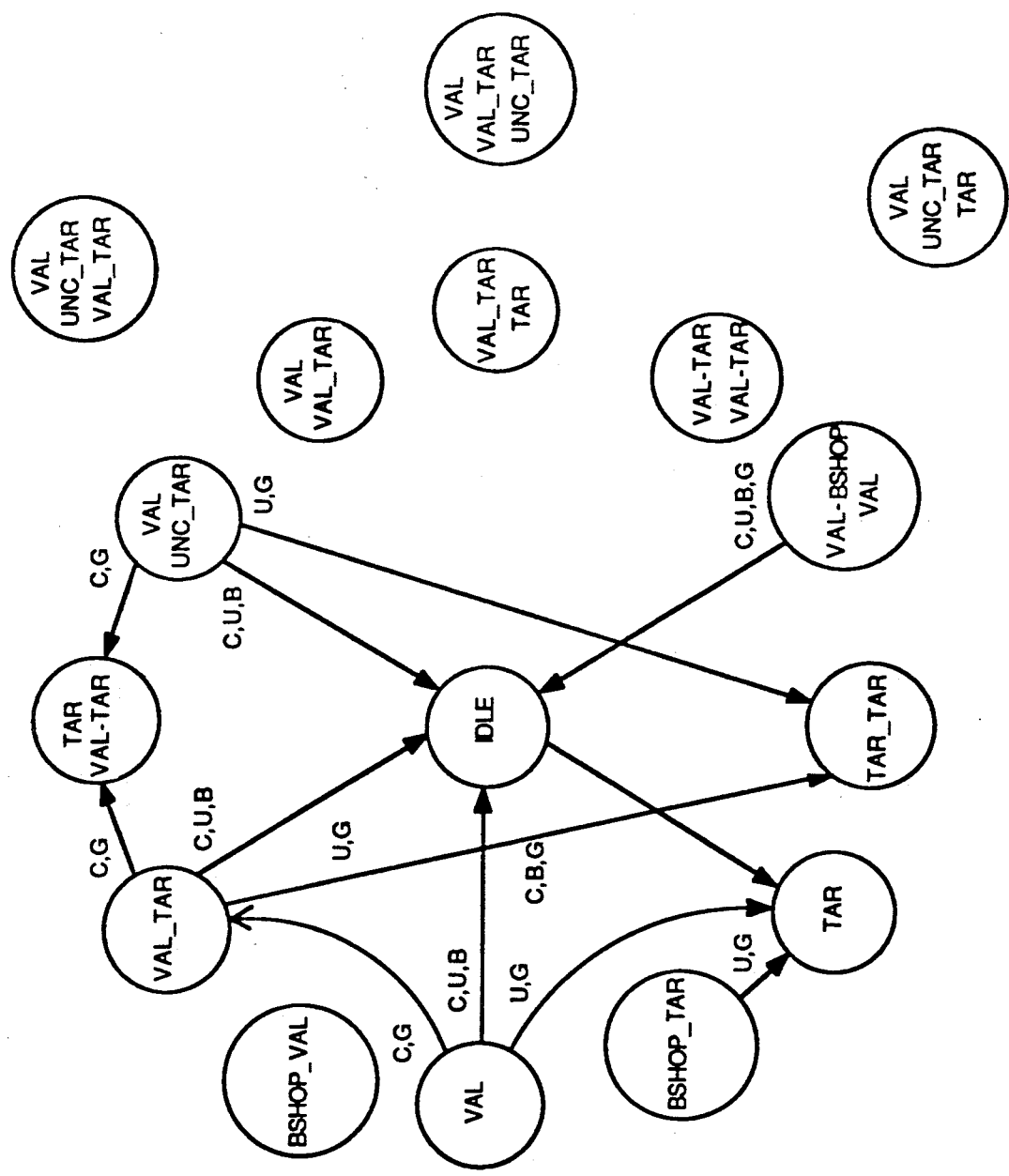
Figure 17:
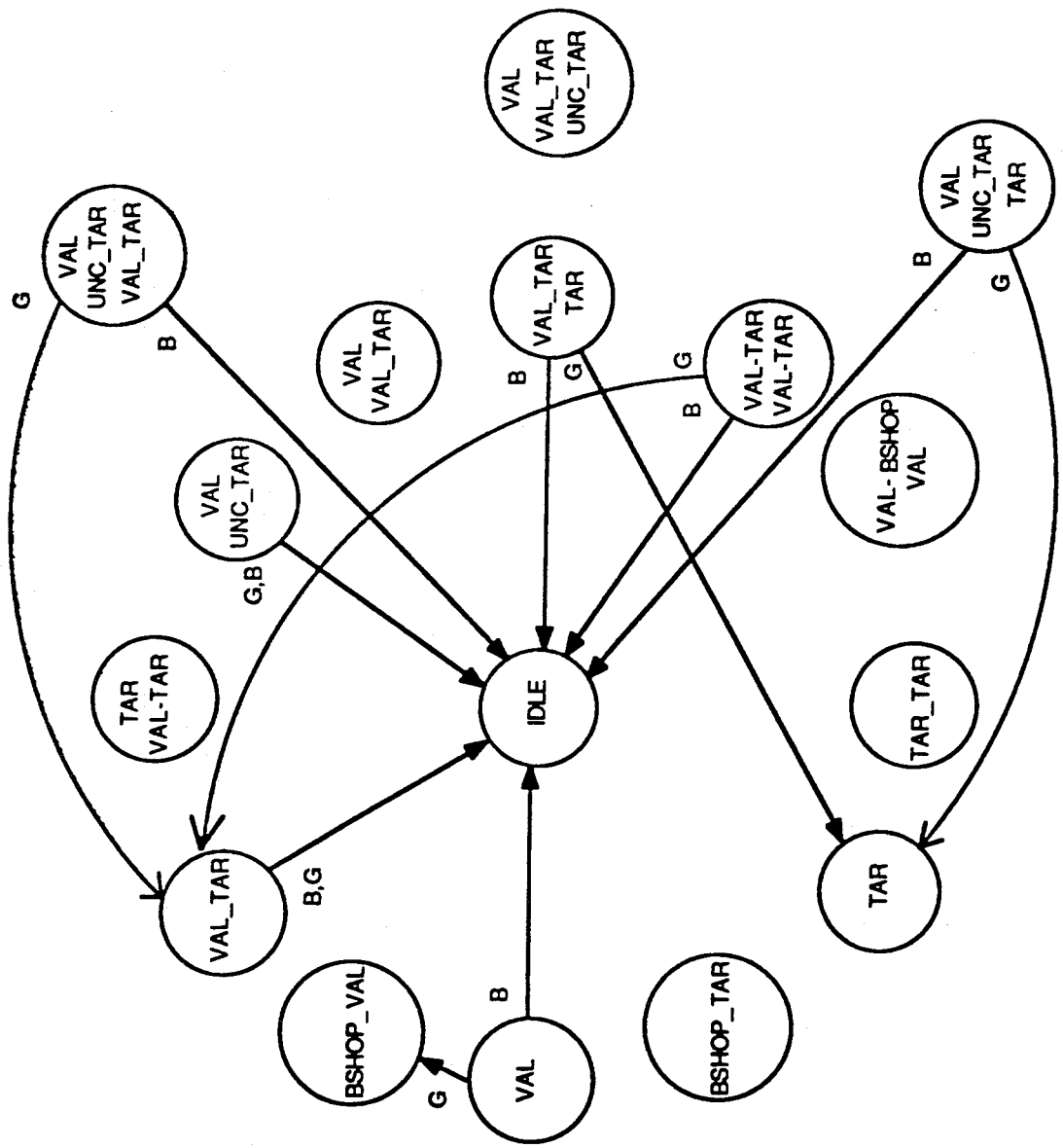
Figure 18:
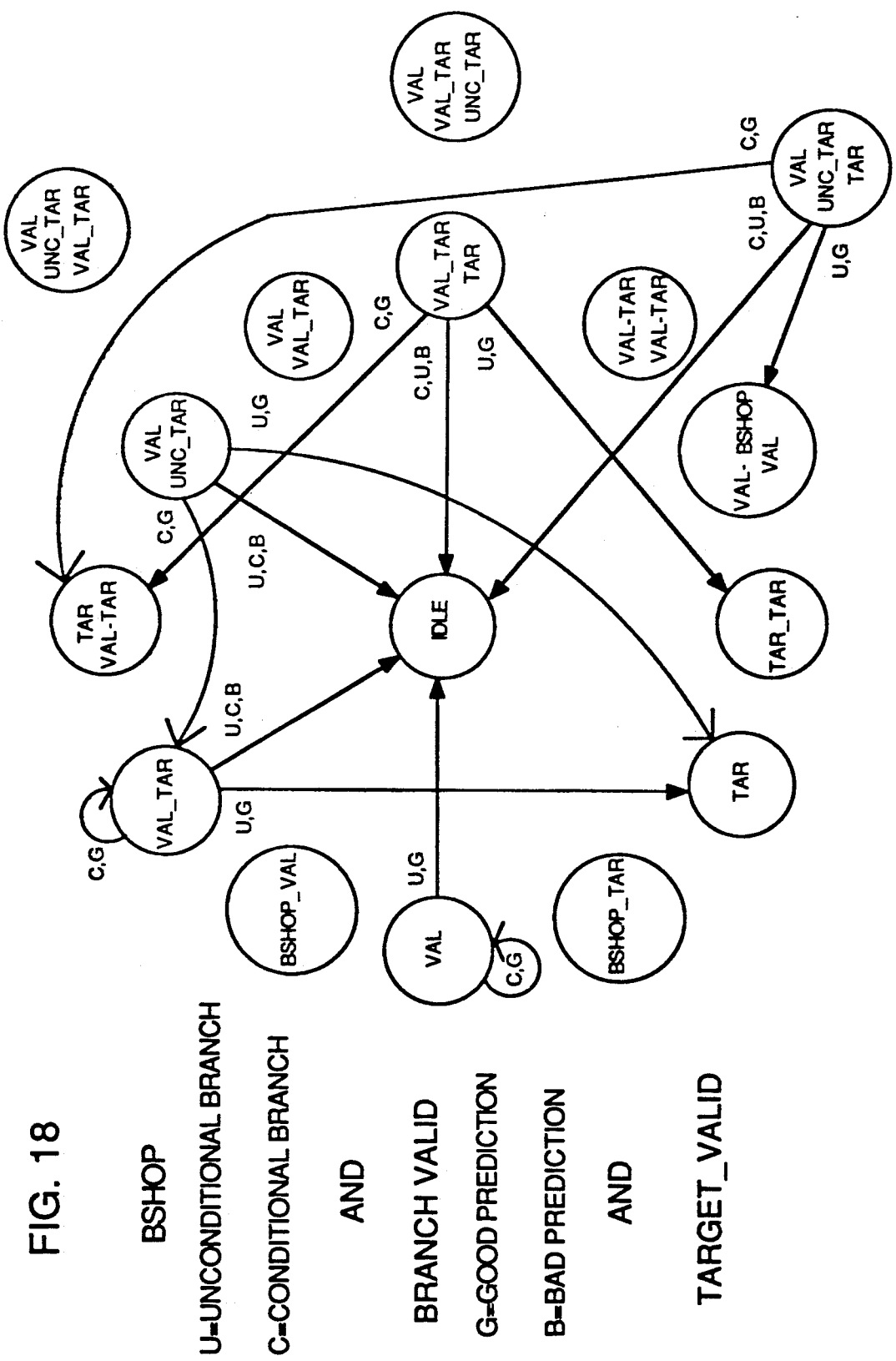

Turning now to the control logic generally designated 150 in FIG. 11 it is seen that the control logic is partitioned into a microcode memory 151, and logic 152 for setting and resetting first and second sets of markers in a register 153. This partitioning results in a considerable simplification because the change in the primary state of the control unit 150 need only be dependent on the first set of markers.

To accommodate pre-processing for three branches, two of which may be conditional branches, the primary state register 154 supplies four bits defining 16 primary states. The transitions for these primary states are shown in the state diagrams of FIGS. 12 to 18. In the state diagrams, the states for which one branch is pending has its state name written on one line and the state names are the same as shown in FIG. 5. The states having two branch pending have their state name written on two lines, the first line of which indicates what is needed to complete processing of the first decoded branch instruction, and the second line indicating what is needed to complete processing of the second decoded branch instruction. The primary states further include three states during which three branch instructions are pending.

As shown in FIG. 11, a state decoder 155 indicates whether the present state has two conditional branches pending or three branches pending. If three branches are pending and another branch instruction is decoded, then a gate 156 generates a signal for stalling the instruction decoder. Another gate 157 generates a signal for stalling the instruction decoder when a conditional branch is decoded and two conditional branches are already pending. The outputs of the gates 156 and 157 are combined in a NOR gate 158 for generating a stall signal to the instruction decoder. The state decoder 155 also provides a signal indicating that an unvalidated conditional branch is pending; this signal is fed to the operand unit for stalling the operand unit whenever the operand unit receives a register increment or register decrement specifier to evaluate.

In order to fully partition the marker logic from the microcode memory 151, the microcode combines the "branch valid" signal, the "branch decision" signal, and its primary state to determine a BRANCH OK signal which qualifies and extends the "branch valid" signal used for setting the markers as shown in FIG. 8 from the time that the "branch decision" signal is received to the time that the computed target address is received from the operand unit. The condition of a prediction being made (BSHOP) when the validation of the branch has come before the computed target address is indicated by a TAR CASES operating mode signalled by a particular combination (SEL=0100₂) of binary states on four mode select lines 159 from the micrcode memory 151 to the marker logic 152. In response to the "tar cases" selection the markers are set according to the following table:

| BRANCH OK | PREDICT TAKEN | BP HIT | NEXT MARKER STATE |
|---|---|---|---|
| 0 | 0 | d | Store in Decode |
| 0 | 1 | d | Ignore |
| 1 | 0 | d | Ignore |
| 1 | 1 | 0 | Store in Decode |
| 1 | 1 | 1 | Ignore |

(Note: "d" means "don't care")

When the marker logic 152 receives the "use cache target" signal, it usually changes the first set of markers to the "ignore" state; however, if the markers are clear or are being cleared or are being loaded, the "use cache target" signal has no effect. Moreover, if one branch instruction follows another, the markers to change will have been shifted from the first set of markers to the second set of markers. The microcode memory 151 generates a signal SEC MRKRS IN USE to tell the marker logic 152 that the second set of markers rather than the first set of markers is to be changed or is pertinent with respect to the "use cache target" signal.

The four mode select lines 159 provide a number of other alternative operating modes for the marker logic 152. In a NOOP mode (SEL=0000₂), there is no change in the markers.

In a TRUE mode (SEL=0001₂), the first markers are set to "store in unwind" if a branch is predicted not taken ("predict taken"=0). If the branch is predicted taken, then the markers are set to "store in decode" if the branch is not in the branch history cache. If the branch is in the branch prediction cache and it is predicted "taken", then the markers are set to "ignore".

In a FALSE mode (SEL=0010₂), the first markers are cleared.

In a SET SID mode (SEL=0011₂), the first markers changed to the "store in decode" state. This mode is used when the first markers are in the "store in unwind" state, a "branch decision" signal is asserted, and the "branch valid" signal indicates that the branch prediction was incorrect.

In a FROM SECOND mode (SEL=0101₂), the first markers are set to the values of the second markers, and the second markers are cleared. This operating mode is used when two branches are pending and the branch prediction unit is finishing the processing of the first one; in other words, the present primary state has two branches pending and the next primary state has one branch pending.

In a SET IG mode (SEL=0110₂), the first set of markers are switched from "store in decode" to "ignore PC". This operating mode is used when a predict taken branch is waiting for the target address from the operand unit and the execute unit indicates that the prediction is wrong.

In a SECOND mode (SEL=1000₂), the second set of markers are set to the "true" mode described previously, and the first set of markers retain their previous values.

In the other operating modes described above, the second markers are cleared, except for the NOOP mode. In the NOOP mode, the next state of the second markers is the same as their present state (unless the markers are changed by the "use cache target" signal).

In a PUSH mode (SEL=1101₂), the first markers are set to the values of the second markers, and the second markers are set in accordance with the "true" mode.

This operating mode is used when going to the primary state VAL VAL TAR UNC TAR.

Figure 19:
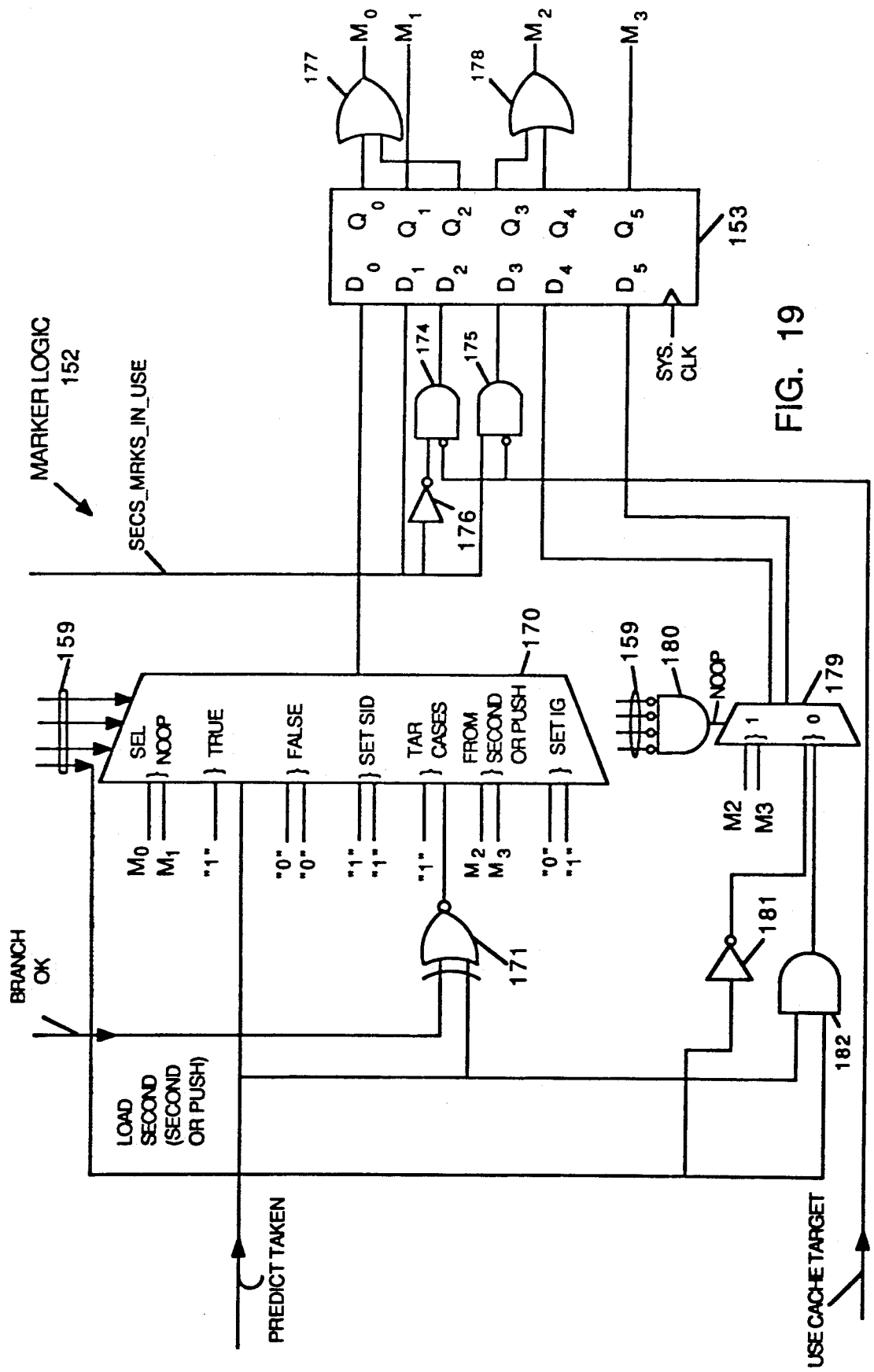
FIG. 19 is a schematic diagram of marker logic used in the control logic of FIG. 11.

The marker control logic is shown in FIG. 19. The mode selection on three of the lines 159 operates a multiplexer 170 which determines the next states of the first set of markers in the marker register 153. An exclusive-NOR gate 171 is used to selectively invert the "predict taken" signal for the TAR CASES mode.

In order to modify the markers in the case of a "cache hit" but subsequently there is not a "use cache target" because the instruction length or displacement from the cache do not match, there are provided two intermediate signals, "DEMOTE FIRST MARKERS" and "DEMOTE SECOND MARKERS", which are produced by two AND gates 174, 175. An inverter 176 determines which signal should be set depending on whether the second markers are in use as indicated by the signal SEC_MRKS_IN_USE being true. An OR gate 177 modifies the first markers such that $M_0$ is always true if "DEMOTE FIRST MARKERS" is true. Similarly, OR gate 178 is used to modify the second markers. Setting of the second markers in the SECOND or PUSH mode is indicated by the fourth one of the select lines 159.

In the NOOP mode, unless forced in response to the "DEMOTE SECOND" signal, the second markers receive their previous state, as selected by a multiplexer 179. The NOOP mode is decoded by an AND gate 180.

Figure 20:
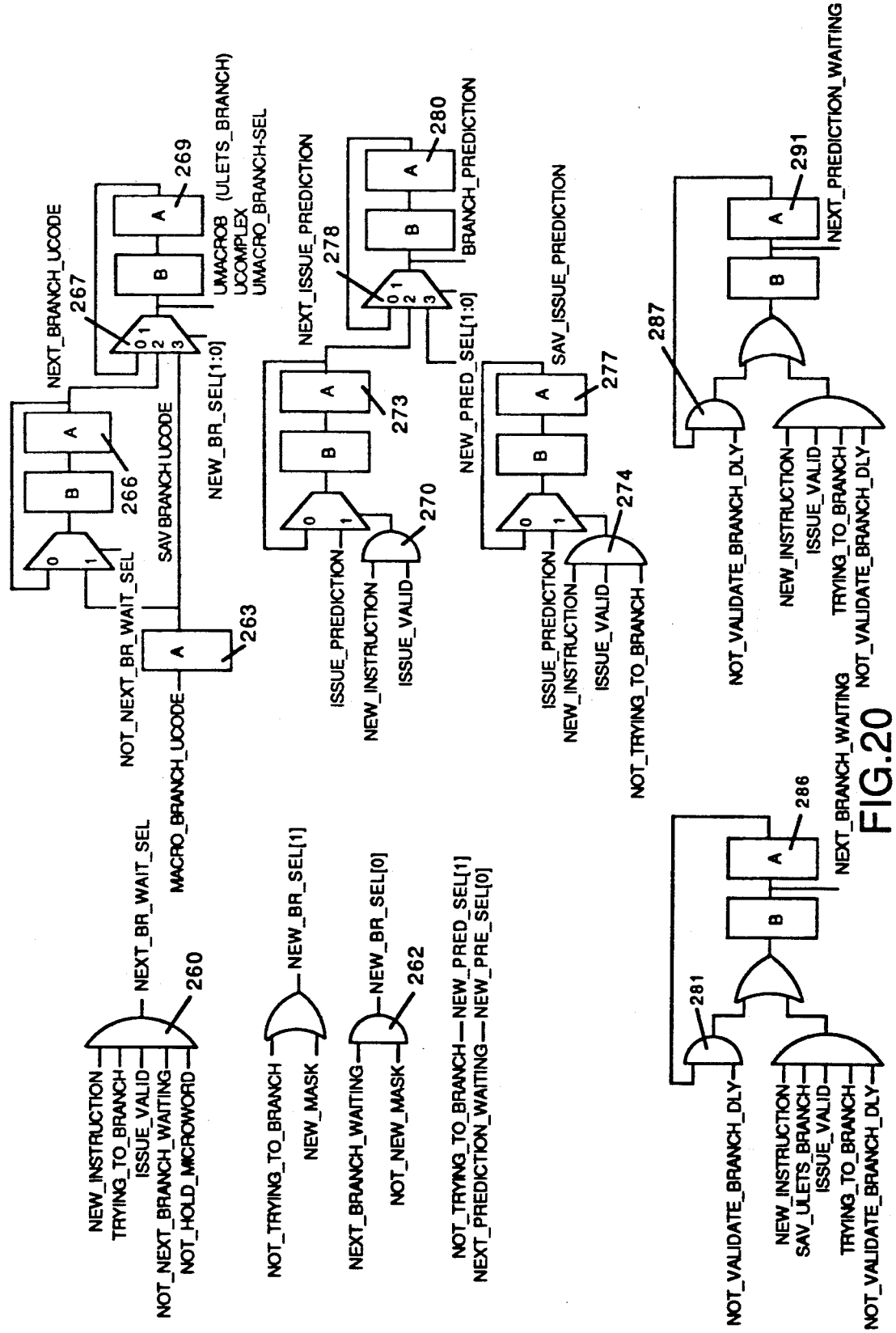
FIG. 20 is a schematic diagram of control logic in the execution unit of the processor of FIG. 1 that keeps track of branch instructions being executed.

Turning now to FIG. 20, there is shown a schematic diagram of control logic in the execution unit (13 in FIG. 1) that keeps track of branch instructions being executed. This control logic must keep track of up to two macrobranches at a time. A third macro branch may be "issued" during the same cycle that the first one is completing. In this case, the control of the first one can be shifted out, making room for the new branch. The SAV_BRANCH_UCODE (in latch 263) is the newest microcode, which may be selected by multiplexer 267 to be used in executing the current branch instruction. The current microcode is held in latch 269 until the branch is completed. For simple branch instructions, the microcode latches will be loaded once. For some complex branches (such as the VAX instruction BBXX), the microcode will send a first set of controls to check the branch direction, but prevent EBOX_BRANCH_VALID if the prediction is wrong. When the microcode is sure that all of the writes that the branch instruction must perform have completed, it will reload the microcode latches to force EBOX_BRANCH and EBOX_BRANCH_VALID. When a new branch is issued while another branch is still in process, the NEXT_BRANCH_UCODE latches (266) are loaded. The signal NEXT_BRANCH_WAITING (latch 286) indicates that these latches have been loaded, so when the first branch completes, the multiplexer 167 will selected the NEXT microcode.

Similarly, at the start of every instruction, the instruction unit's branch prediction for that instruction must be latched. If there are no branches in progress, the SAV_ISSUE_PREDICTION latch (277) will be loaded. If the execution unit is already working on a branch, the NEXT_ISSUE_PREDICTION latch (273) will be loaded. The signal NEXT_PREDICTION_WAITING (191) indicates that this latch has been loaded, so when the first branch completes, multiplexer 178 will take the NEXT prediction.

Figure 21:
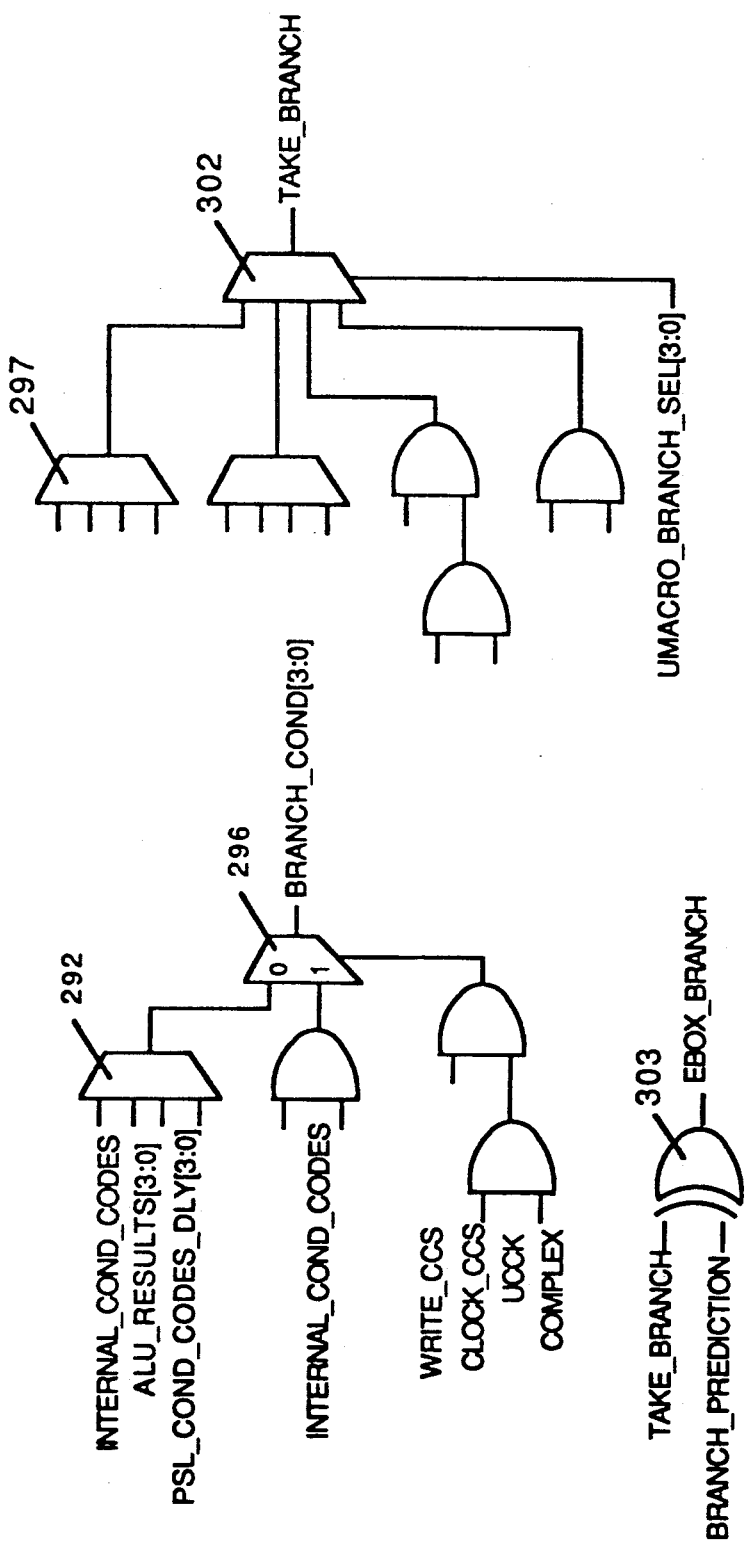
FIG. 21 is a schematic diagram of logic in the execution unit that generates all possible branch conditions and selects the condition for a current instruction being executed.

Once the branch logic knows which microcode to use to do the branch check, it must generate all the possible branch conditions. Referring to FIG. 21, there is shown a schematic diagram of this logic in the execution unit that generates all possible branch conditions. The possible branch conditions are shown in FIG. 22.

Simple branches check the PS condition codes left by the previous instruction. The previous instruction could "clock" these bits, by using the UCCK microcode and the condition codes resulting from that instruction's operation. The previous instruction could also write its results directly into the PSL condition code latches. In some cases, the previous instruction does not change the condition codes that will branched on, so the previous value, PSL_COND_CODES_DLY, will be used. For complex branches, the conditions that result from previous microinstructions (INTERNAL_CONDITION_CODES) are checked. It would take too much time to set the PSL condition codes and then multiplex them with the INTERNAL_CONDITION_CODES before doing the branch check, so these steps are merged to form the BRANCH_COND's (multiplexer 296).

Once the branch conditions are determined, the current branch's microcode is used to select the correct condition and set TAKE_BRANCH (multiplexer 302) if the branch should be taken. This value is compared to the instruction unit's prediction to set EBOX_BRANCH (303) (meaning the prediction was wrong). This check is done every cycle, just in case the results will be used (EBOX_BRANCH_VALID is set).

If the branch conditions could not be generated quickly enough to complete the branch check in the same cycle, the advantage of the special branch checking logic would be lost. It would then be just as quick to perform the branch check in the integer functional unit in the following cycle. All non-branch instructions which depend on the state of the previous instruction must wait the extra cycle before being executed.

Figure 23A:
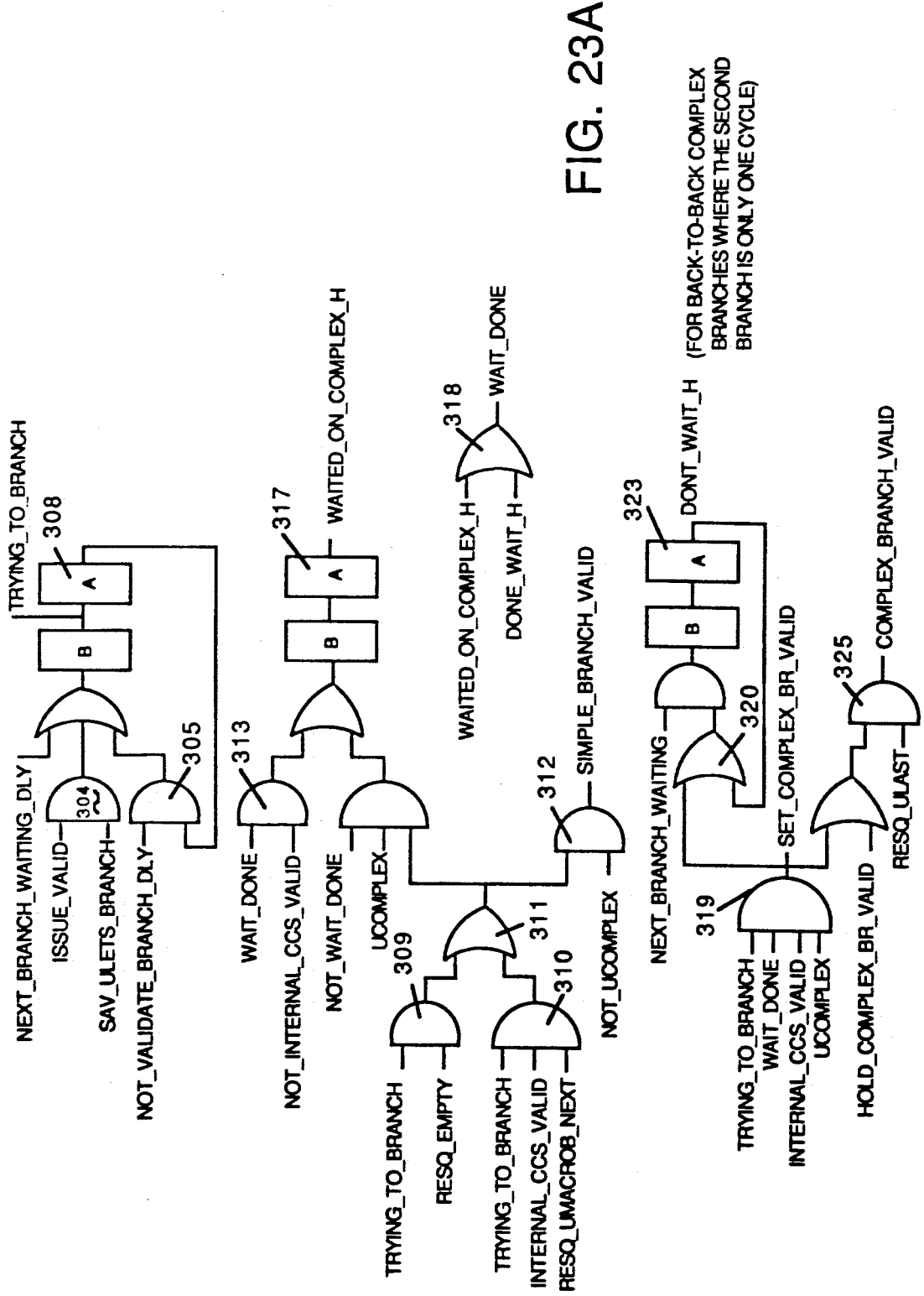
FIGS. 23A and 23B are a schematic diagram of logic in the execution unit that determines when to validate the branch condition selected by the logic of FIG. 21.
Figure 23B:
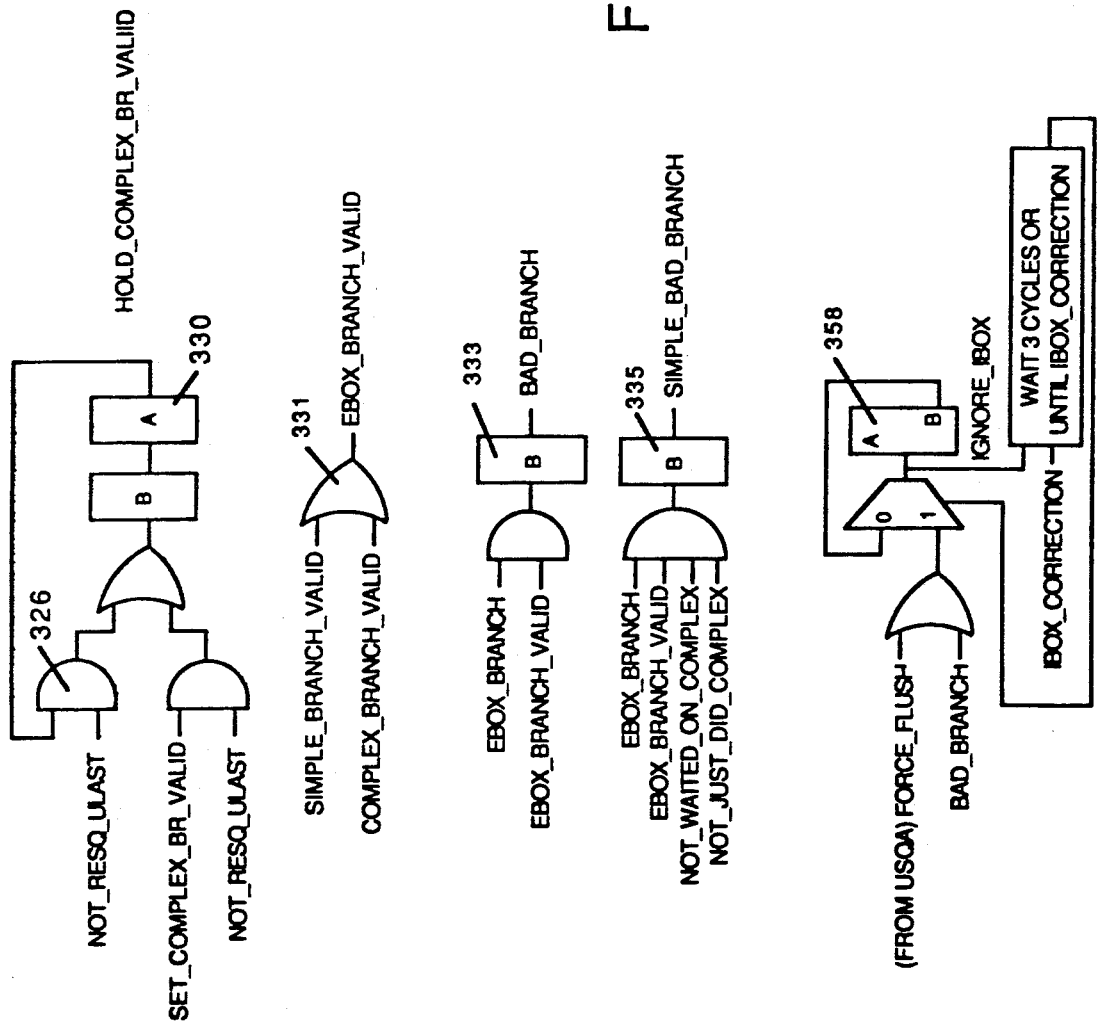

Turning now to FIGS. 23A and 23B, there is shown the execution unit's branch control logic that determines when to validate the results of the branch condition logic of FIG. 21. The first state shown, TRYING_TO_BRANCH (latch 308) is set whenever a branch is in progress. It is set when a new branch is issued (gate 304), or when another branch has been waiting to start (NEXT_BRANCH_WAITING). It is kept up until the branch is validated (gate 305).

For complex branches, the microcode for the branch check and the microcode to perform the operation (the results of which are used to do the check) are issued at the same time. So complex branches must wait one cycle for the operation to complete before the check can be performed. As soon as the "wait" cycle is done, the state WAITED_ON_COMPLEX (latch 317) is set. If the internal condition codes are valid (meaning the operation was retired), then the complex branch check can be done.

For simple branches, as soon as the previous instruction finishes, the check can be performed. The result queue in the execution unit keeps track of the order in which to retire the instructions that the execution unit is currently working on. If the result queue is empty, then the previous instructions must be finished, and the branch check can be done right away (gate 309). If the result queue is not empty, and the branch is in the second-to-last slot, then the previous instruction is about to retire. As soon as its condition codes are valid (the retirement is actually performed), then the branch check can be done (gate 310). When either of these conditions exists (gate 311) and it is a simple branch (UCOMPLEX is not set), then the branch can be validated. When either of these conditions exist and it is a complex branch, then the "wait" cycle can begin.

Since simple branches never write results, as soon as the branch check is done, the direction can be reported. In fact, if the prediction is wrong and the (wrong) instruction after the simple branch were trying to write to a register or memory, that write would have to be stopped. The signal BAD_BRANCH (gate 333) is raised when a prediction was wrong to stop the retirement of that instruction, and also flush the pipeline of the execution unit. Complex branches, however, may need to write a register or the memory. For these the branch validation must wait for the write to retire, which is indicated by RESQ_ULAST from the ISSUE unit (gate 325). If the validation did not wait, BAD_BRANCH could prevent the write. In most cases, the retire will complete immediately, and the validation will not be delayed. When the retire is stalled, HOLD_COMPLEX_BR_VALID (latch 330) is set so that the branch will not be forgotten.

When any simple or complex branch follows a regular simple branch, the timing of the second branch is independent of the first branch. When a simple branch directly follows a complex branch, however, the simple branch check will be delayed one cycle. That is because the complex branch has a "wait" cycle before its "branch" cycle, and it will be doing the branch check when the simple branch would ideally like to be checking. In fact, if the complex branch is followed by a steady stream of simple branches, each one of the simple branch checks will be delayed.

The signal SIMPLE_BAD_BRANCH (latch 335) is needed to warn the ISSUE unit when the relative timing of EBOX_BRANCH_VALID and the simple branch's retirement will be delayed. SIMPLE_BAD_BRANCH is asserted when EBOX_BRANCH_VALID is NOT delayed and the prediction was bad (when the prediction is good, the ISSUE unit doesn't really need to know which BRANCH_VALID matches which instruction). SIMPLE_BAD_BRANCH is cleared for complex branches (which are always delayed) and simple branches that have been delayed by a previous complex branch.

Similarly, if a complex branch is directly followed by a one cycle complex branch, the second branches "wait" cycle will overlap with the first branches "branch" cycle. To prevent double waiting on the second branch, the signal DONT_WAIT (latch 323) is generated. It is OR'd with WAITED_ON_COMPLEX (gate 317) to set WAIT_DONE (gate 318), which validates the complex branch. If the branch is stalled (because RESQ_ULAST is stalled) then the fact that the wait is done is saved in the WAITED_ON_COMPLEX logic.

When a delayed branch is followed by a multi-cycle complex branch, the second branch is independent of the first branch because the first microcycle of the second branch does not need the branch checking logic. If a delayed branch is followed by a one cycle complex branch, the "wait" cycle of the second branch will overlap the "branch" cycle of the first branch. So the timing of the second complex branch is still independent of the first branch.

When the branch prediction is wrong, or when the execution unit flushes the instruction unit for some other reason, the control and data that the instruction unit sends to the execution unit will not be valid until three cycles have passed or IBOX_CORRECTION has been asserted, which ever is sooner. To prevent the execution unit from using bad data, IGNORE_IBOX (latch 338) is distributed to any part of the execution unit that receives data from the instruction unit.

In view of the above, a branch prediction unit for a pipelined computer has been disclosed that predicts and pre-processes multiple branch instructions simultaneously to reduce the frequency of stalls due to incorrect branch predictions. The prediction is made at the earliest possible time and is made based upon the most reliable information available about the past history of execution in the computer or execution of similar computer programs. A branch history cache is used storing previously computed target addresses, but the cache need not be flushed during a change in the computer program because the cache also stores associated displacement information which is compared with the actual displacement information for the branch instruction being predicted to verify that the target address in the cache is correct. To minimize the size of the cache, only new "branch taken" entries are written into the cache. Control logic is also disclosed for making branch predictions as soon as possible regardless of the order in which a branch instruction is decoded, its target address is computed, and its branch decision is made. The branch prediction unit is simplified by partitioning the control logic into marker logic which records branch predictions and decisions and microcode which responds to the sequence of instruction decoding, target address computation, and branch decision. In addition, a branch resolution logic in the execution unit further reduces the frequency and length of stalls by making the branch decision at the earliest possible time.

We claim:

1. A method of predicting whether a branch specified by a branch instruction in a computer program will be taken or not during execution of said instruction by a digital computer, said computer having an instruction decoder for pre-processing instructions in said computer program prior to execution of said instructions, said branch instruction being located in said computer program at a respective instruction address, said branch instruction including a particular one of a plurality of predefined branch operation codes, said branch instruction specifying a corresponding target address where execution of said computer program branches to when said branch instruction is executed and said branch is taken, said method comprising the steps of:

searching a cache memory having prestored therein information associated with instructions indicating whether branches associated with said instructions should be predicted taken or not;

when information associated with the branch instruction is not found in said cache memory, predicting that said branch will be taken or not based upon a respective branch bias predetermined for the branch instruction's branch operation code;

when information associated with the branch instruction is found in said cache memory, predicting that said branch will be taken or not in accordance with said information associated with said branch instruction indicating whether the branch associated with the branch instruction should be predicted taken or not; and pre-processing instructions in said computer program beginning at the target address specified by the branch instruction when it is predicted that a branch will be taken.

2. The method as claimed in claim 1, wherein said branch instruction specifies the displacement of said corresponding target address from the location of said branch instruction in said computer program, and wherein said cache memory has prestored therein predetermined displacement information and target addresses of branches associated with said instructions, and wherein said method further comprises the step of comparing the displacement specified by said branch instruction with the associated displacement information in the cache memory when information associated with the branch instruction is found in the cache memory, and wherein said step of pre-processing instructions in said computer program at the target address includes the step of using the respective target address associated with the branch instruction in the cache memory as the target address specified by the branch instruction when said step of comparing indicates that the associated target address in said cache memory is the same as the target address specified by the branch instruction.

3. The method as claimed in claim 2, wherein said target address for said branch instruction is equal to the sum of the address of the branch instruction, the length of the branch instruction, and the value of a displacement specifier in the branch instruction; the information stored in the cache memory is associated with instruction addresses; the displacement information stored in the cache memory includes a displacement value and an instruction length value; said step of comparing includes comparing the associated displacement value to the value of said displacement specifier in the branch instruction and comparing the associated length value to said length of said branch instruction, and wherein said step of comparing indicates that the associated target address in said cache memory is the same as the target address specified by the branch instruction when the associated length value is the same as said length of said branch instruction and the associated displacement value is the same as the value of said displacement specifier in said branch instruction.

4. The method as claimed in claim 1, wherein said plurality of predefined operation codes includes codes for certain "loop branch instructions" which are "conditional" branch instructions that are sometimes taken during execution but are always predicted taken.

5. The method as claimed in claim 1, wherein said plurality of predefined operation codes includes codes for certain "unconditional" branch instructions that are always taken during execution and are always predicted taken.

6. The method as claimed in claim 1 further comprising an initial step of serially shifting branch bias information into a branch bias register having parallel outputs which are selected in response to the branch instruction's operation code to predict that said branch will be taken or not based upon said respective branch bias.

7. The method as claimed in claim 1, further comprising the step of writing to said cache memory information associated with said branch instruction when associated information is not already in the cache memory but only when the information to be written indicates that the branch should be taken.

8. The method as claimed in claim 7, wherein said step of writing to said cache memory occurs before execution of the branch instruction when it is predicted that said branch will be taken based upon said respective branch bias, and after execution of the branch instruction when the branch is taken but it had been incorrectly predicted that the branch would not be taken.

9. The method of claim 8, further comprising the step of changing the information in said cache memory indicating whether the branch should be taken or not after the branch is taken, said changing being performed when said information associated with the branch instruction is already in the cache memory and it had been incorrectly predicted that the branch would be taken.

10. The method as claimed in claim 1, further comprising the step of writing to said cache memory information associated with said branch instruction, said step of writing being performed before the execution of the branch instruction when said information is not already in said cache memory and it is predicted that said branch will be taken based upon said respective branch bias.

11. The method as claimed in claim 1, wherein said cache memory stores displacement information associated with said instructions, and wherein said cache memory is searched during a first time period for information associated with said branch instruction and the associated displacement information is read from said cache memory, and wherein during a subsequent second time period, the associated displacement information read from said cache memory is compared with a displacement specified by the branch instruction while said cache memory is searched for information associated with a subsequent instruction.

12. The method as claimed in claim 11, wherein the associated information indicating whether a branch should be predicted taken or not is read from said cache memory and stored in said first time period, and said information having been stored is modified in said second time period in response to the comparison.

13. The method as claimed in claim 11, wherein said step of pre-processing instructions in said computer program occurs in said second time period when information for the branch instruction is not found in said cache memory during said first time period and it is predicted that said branch will be taken based upon said respective branch bias and the target address specified by the branch instruction is available in said second time period.

14. A method of predicting whether a branch specified by a branch instruction in a computer program will be taken or not during execution of said instruction by a digital computer, said digital computer having an instruction decoder for pre-processing instructions in said computer program prior to execution of said instructions, said branch instruction being located in said computer program at a respective instruction address, said branch instruction including a particular one of a plurality of predefined branch operation codes, said branch instruction specifying a branch displacement which determines a corresponding target address where execution of said computer program branches to when said branch instruction is executed and said branch is taken, said method comprising the steps of:

searching a cache memory having prestored therein information indicating whether branches associated with respective instructions should be predicted taken or not and respective displacement information for the branches, and respective target addresses determined by the respective displacement information; and when information associated with the branch instruction is found in said cache memory, then (a) when said information indicates that said branch should be predicted not taken, predicting that said branch will not be taken, and (b) when said information indicates that said branch should be predicted taken, comparing the associated displacement information in said cache memory to the displacement specified by the branch instruction, and when the comparing indicates that the target address determined by the associated displacement information is the same as the target address determined by the displacement specified by the branch instruction, then (i) predicting that said branch will be taken, and (ii) pre-processing instructions in said computer program beginning from the respective target address in the cache memory associated with the branch instruction.

15. The method as claimed in claim 14, wherein said target address for said branch instruction is equal to the sum of the address of the branch instruction, the length of the branch instruction, and the value of a displacement specifier in the branch instruction; said information stored in the cache memory is associated with instruction addresses; the information stored in the cache memory which indicates a respective displacement includes a displacement value and an instruction length value; and said comparing indicates that the target address determined by the associated displacement information is the same as the target address determined by the displacement specified by the branch instruction when both the value of the displacement specifier is the same as the displacement value stored in the cache memory, and the branch instruction's length is the same as the instruction length value stored in the cache memory.

16. The method as claimed in claim 14, wherein said plurality of predefined operation codes includes codes for certain "loop branch instructions" which are "conditional" branch instructions that are sometimes taken during execution but are always predicted taken.

17. The method as claimed in claim 14, wherein said plurality of predefined operation codes includes codes for certain "unconditional" branch instructions that are always taken during execution and are always predicted taken.

18. The method as claimed in claim 14, further comprising an initial step of serially shifting branch bias information into a branch bias register having parallel outputs which are selected in response to the branch instruction's operation code to predict that said branch will be taken or not based upon said branch instruction's operation code.

19. The method as claimed in claim 14, further comprising the step of writing to said cache memory information associated with said branch instruction when associated information is not already in the cache memory but only when the information to be written indicates that the branch should be taken.

20. The method as claimed in claim 14, wherein said cache memory is searched during a first time period for information associated with said branch instruction and the associated information is read from said cache memory and stored, and wherein during a subsequent second time period, the associated displacement information having been read from the cache memory and stored is compared with the displacement specified by the branch instruction while said cache memory is searched for information associated with a subsequent instruction.

21. The method as claimed in claim 20, wherein the information indicating whether a branch should be predicted taken or not is read from said cache memory and stored in said first time period, and the associated information having been stored which indicates whether the branch associated with the branch instruction is to be predicted taken or not is modified in said second time period based on the comparing of the associated displacement information with the displacement specified by the branch instruction.

22. The method as claimed in claim 14 further comprising the subsequent steps of changing said computer program and without flushing said cache memory, repeating said steps of searching, predicting, comparing and pre-processing.

23. A method of predicting whether a branch specified by a branch instruction in a computer program will be taken or not during execution of said instruction by a digital computer, said digital computer having an instruction unit for pre-processing instructions in said computer program prior to execution of said instructions, said branch instruction being located in said computer program at a respective instruction address, said branch instruction including a particular one of a plurality of predefined branch operation codes, said branch instruction specifying a branch displacement which determines a corresponding target address where execution of said computer program branches to when said branch instruction is executed and said branch is taken, said instruction unit providing the operation code and address of said branch instruction during a first time interval, providing the branch displacement of said branch instruction during a second time interval, and computing the corresponding target address from said branch displacement during a third time interval, said method comprising the steps of:

(a) prior to execution of said branch instruction, making a prediction of whether the branch of said branch instruction will be taken or not, (b) during said first time interval, searching a cache memory storing target addresses and displacement information associated with instruction addresses to obtain from said cache memory any displacement information and target address associated with said address of said branch instruction, (c) when associated displacement information and an associated target address are obtained from said cache memory, verifying during said second time interval that the associated target address is the same as the corresponding target address that will be computed during said third time interval, said verifying being performed by comparing the associated displacement information obtained from said cache memory to the branch displacement of said branch instruction, and when the associated target address is so verified and when it is predicted that said branch will be taken, beginning pre-processing of said instructions beginning at said target address, and (d) when said step of verifying determines that the associated target address is not the same as the target address that will be computed during said third time interval and when it is predicted that said branch will be taken, waiting for the target address being computer, and in said third time interval beginning pre-processing of said instructions beginning at the computed target address.

24. The method as claimed in claim 23, wherein said step of making a prediction includes reading from said cache memory information associated with the address of said branch instruction indicating whether the branch should be predicted taken or not.

25. The method as claimed in claim 23, wherein said step of making a prediction is based upon a branch bias predetermined for the branch instruction's operation code when information associated with the branch instruction is not found in said cache memory.

26. The method as claimed in claim 23, wherein said step of making a prediction includes decoding said operation code to determine whether the operation code specifies an unconditional or loop branch, and when the operation code specifies an unconditional or loop branch, predicting that said branch is taken regardless of any information in the cache that is associated with the branch instruction's address.

27. The method as claimed in claim 23, wherein the prediction having been made is stored, and the stored result is selectively changed based on said comparing.

28. The method as claimed in claim 23, wherein said branch prediction is made in a first stage of a pipelined circuit and said comparing is performed in a second subsequent stage of said pipelined circuit.

29. The method as claimed in claim 23, wherein at the time said comparing is performed for said branch instruction, a branch prediction is made for a subsequent branch instruction in said computer program.

30. A method of predicting whether a branch specified by a branch instruction in a computer program will be taken or not during execution of said instruction by a digital computer; said digital computer having an instruction unit for pre-processing instructions in said computer program prior to execution of said instructions, and an execution unit for executing the instructions after pre-processing; said branch instruction being located in said computer program at a respective instruction address, said branch instruction including a particular one of a plurality of predefined branch operation codes, said branch instruction specifying a branch displacement which determines a corresponding target address where execution of said computer program branches to when said branch instruction is executed and said branch is taken; said instruction unit including means for decoding instructions providing a branch signal indicating the decoding of a branch instruction, and means for computing the target address corresponding to the branch instruction and providing a target signal indicating the computing of the target address; said execution unit providing a validation signal indicating whether or not a branch is taken during execution; said branch, target and validation signals occurring in various sequences for the pre-processing and execution of a respective branch instruction; said method comprising the steps of:

(a) determining a primary state characteristic of the current sequence of branch, target, and validation signals, (b) predicting whether the respective branch instruction will be taken or not during execution, and in response to said branch signal, setting markers indicating what to do with the computed target address when it has been computed, (c) in response to said validation signal and the current primary state, either setting said markers in accordance with whether the branch is to be taken when a branch has not yet been predicted, or unwinding the instruction unit by discarding the results of pre-processed instructions in the incorrect path and taking the correct path in the event that a branch has been incorrectly predicted, and (d) in response to said target signal, disposing of the computed target address in the manner indicated by said markers.

31. The method as claimed in claim 30, wherein a first branch instruction is predicted taken and instructions beginning at its respective target address are pre-processed before the first branch instruction is executed, said instructions being pre-processed including a second branch instruction, said second branch instruction being predicted taken and an instruction at its respective target address being preprocessed before the first branch instruction is executed.

32. The method as claimed in claim 31, further comprising the step of setting a second set of markers indicating what to do with the target address computed for the second branch instruction when it has been computed.

33. The method as claimed in claim 32, wherein the next primary state is dependent only upon the present state of one of the sets of markers.

34. The method as claimed in claim 30, wherein said computer includes a cache memory storing prediction information and target addresses associated with branch instructions, and further comprising the steps of reading said cache and setting said markers in response to associated prediction information read from said cache after receiving said branch signal, and thereafter determining whether the associated target address from the cache memory is valid and in response to that determination selectively changing said markers.

35. A method of branch prediction for a pipelined processor having an instruction unit and an execution unit, said instruction unit including means for decoding instructions to obtain operands specified by said instructions, said execution unit including means for executing said instructions to perform specified operations upon said operands to obtain respective results, said instructions including conditional branch instructions wherein a decision whether the sequence of instruction execution is to branch or not is governed by said results, said method of branch prediction including:

predicting the outcomes of the respective decisions whether to branch or not for said conditional branch instructions;

said decoding means of said instruction unit decoding instructions in the predicted instruction streams following the conditional branch instructions;

comparing the predicted outcomes to the respective results of said execution unit, and when the predicted outcomes are found to be contrary to the respective results, flushing from the instruction unit information from the instructions in the predicted instruction streams following the conditional branch instructions; and while said execution unit is executing a current instruction, looking ahead to the next instruction in the instruction stream and comparing the predicted outcome to the respective result for that next instruction in the event that said next instruction is a conditional branch instruction so that information from instructions in the predicted instruction stream following said conditional branch instruction is more quickly flushed from the instruction unit when the predicted outcome for the conditional branch instruction is found to be contrary to the respective result for the conditional branch instruction.

36. The method of branch prediction as claimed in claim 35, wherein said looking ahead to the next instruction includes delaying said comparing for said next instruction until said next instruction becomes the current instruction and is executed in the event that said next instruction is a conditional branch instruction and its own execution would change the respective result upon which its branch decision is based.

37. The method of branch prediction as claimed in claim 35, wherein said looking ahead to the next instruction includes selecting the respective result upon which the branch decision for the next instruction is based from the results of the execution of instructions in the instruction stream prior to said current instruction in the event that the execution of said current instruction will not change said respective result, and selecting said respective result from the results of the execution of the current instruction in the event that the execution of said current instruction will change said respective results.

38. The method of branch prediction as claimed in claim 35, wherein said generating said validation signal for said next instruction includes generating a set of the possible results upon which the branch decisions of various kinds of conditional branch instructions decodable by said instruction unit are based, and selecting from said set of possible results the respective result upon which the branch decision for the next instruction is based.

39. A pipelined processor having an instruction unit and an execution unit, said instruction unit including means for decoding instructions to obtain operands specified by said instructions, said execution unit including means for executing said instructions to perform specified operations upon said operands to obtain respective results, said instructions including branch instructions wherein a decision whether the sequence of instruction execution is to branch or not is governed by said results, said instruction unit including branch prediction means for predicting the outcome of the respective decisions whether to branch or not for said branch instructions and causing said instruction unit to decode instructions in the predicted instruction streams following the branch instructions, said execution unit including means for validating the predictions by said means for predicting and generating validation signals for flushing from the processor the operands obtained from the decoding of instructions in the predicted instruction streams following the conditional branch instructions in the event that the respective results are found to be contrary to the respective predictions, said branch instructions being located in said instruction stream at respective instruction address, said branch instructions including respective ones of a plurality of predefined branch operation codes, said branch instructions specifying respective corresponding target addresses where execution of said instruction stream is to branch to when said branch instructions are executed and said branch is taken, wherein said branch prediction means comprises:

a cache memory having prestored therein information associated with instructions indicating whether branches associated with said instructions should be predicted taken or not;

means for searching said cache memory for information associated with a current branch instruction being decoded; and means, selected when information associated with the branch instruction is not found in said cache memory, for predicting that said branch will be taken or not based upon a respective branch bias predetermined for the branch instruction's branch operation code, and means, selected when information associated with the branch instruction is found in said cache memory, for predicting that said branch will be taken or not in accordance with said information associated with said branch instruction indicating whether the branch associated with the branch instruction should be predicted taken or not.

40. The pipelined processor as claimed in claim 39, wherein said branch instructions specify the displacement of said corresponding target addresses from the respective locations of said branch instruction in said instruction stream, and wherein said cache memory has prestored therein predetermined displacement information and target addresses of branches associated with said instructions, and wherein said branch prediction means further comprises means for comparing the displacement specified by said branch instruction with the associated displacement information in the cache memory when information associated with the branch instruction is found in the cache memory, and means for selecting the respective target address associated with the branch instruction in the cache memory as the target address specified by the branch instruction when said means for comparing indicates that the associated target address in said cache memory is the same as the target address specified by the branch instruction.

41. The pipelined processor as claimed in claim 40, wherein said target address for said branch instruction is equal to the sum of the address of the branch instruction, the length of the branch instruction, and the value of a displacement specifier in the branch instruction; the information stored in the cache memory is associated with instruction addresses; the displacement information stored in the cache memory includes a displacement value and an instruction length value; said means for comparing includes means for comparing the associated displacement value to the value of said displacement specifier in the branch instruction and comparing the associated length value to said length of said branch instruction, and indicating that the associated target address in said cache memory is the same as the target address specified by the branch instruction when the associated length value is the same as said length of said branch instruction and the associated displacement value is the same as the value of said displacement specifier in said branch instruction.

42. The pipelined processor as claimed in claim 39, wherein said branch prediction means further comprises means for queuing branch information for at least first and second branch instructions to predict the branch decision for said second branch instruction for decoding instructions in the predicted instruction stream following said second branch instruction before the predicted branch decision for said first branch instruction is verified by said execution unit.

43. The pipelined processor as claimed in claim 42, wherein said means for queuing is operative for queuing branch information for three branch instructions including one unconditional branch instruction and two conditional branch instructions.

44. A pipelined processor having an instruction unit and an execution unit, said instruction unit including means for decoding instructions to obtain operands specified by said instructions, said execution unit including means for executing said instructions to perform specified operations upon said operands to obtain respective results, said instructions including conditional branch instructions wherein a decision whether the sequence of instruction execution is to branch or not is governed by said results, said instruction unit including a branch prediction unit for predicting the outcome of the respective decisions whether to branch or not for said conditional branch instructions and causing said instruction execution unit to decode instructions in the predicted instruction streams following the conditional branch instructions, said execution unit including means for validating the predictions by said means for predicting and generating validation signals for flushing from the processor the operands obtained from the decoding of instructions in the predicted instruction streams following the conditional branch instructions when the respective results are found to be contrary to the respective predictions, wherein
said execution unit includes means operative during the execution of a current instruction for looking ahead to the next instruction in the instruction stream and generating the respective validation signal for that next instruction in the event that said next instruction is a conditional branch instruction.

45. The pipelined processor as claimed in claim 44, wherein said means operative during the execution of said current instruction includes means for delaying the generation of said respective validation signal for said next instruction until said next instruction becomes the current instruction and is executed in the event that said next instruction is a conditional branch instruction and its own execution would change the respective result upon which its branch decision is based.

46. The pipelined processor as claimed in claim 44, wherein said means operative during the execution of said current instruction comprises means for selecting the respective result upon which the branch decision for the next instruction is based from the results of the execution of instructions in the instruction stream prior to said current instruction in the event that the execution of said current instruction will not change said respective result, and selecting said respective result from the results of the execution of the current instruction in the event that the execution of said current instruction will change said respective result.

47. The pipelined processor as claimed in claim 44, wherein said means operative during the execution of said current instruction comprises means for generating a set of the possible results upon which the branch decisions of various kinds of conditional branch instructions decoded by said instruction unit are based, and means for selecting from said set of possible results the respective result upon which the branch decision for the next instruction is based.

* * * * *